United States Patent [19] [11] Patent Number: 6,023,615
Bruckert et al. [45] Date of Patent: Feb. 8, 2000

[54] METHOD FOR CONTROLLING A DIVERSITY RECEIVER APPARATUS IN A RADIO SUBSCRIBER UNIT

[75] Inventors: Eugene J. Bruckert, Arlington Heights; Richard Joseph Vilmur, Palatine, both of Ill.

[73] Assignee: Motorola, Inc., Schaumburg, Ill.

[21] Appl. No.: 08/564,763

[22] Filed: Nov. 29, 1995

[51] Int. Cl.[7] .................................................. H04B 7/08
[52] U.S. Cl. ..................... 455/277.2; 455/67.3; 455/101; 455/504; 375/347
[58] Field of Search .............................. 455/277.1, 277.2, 455/67.3, 226.3, 226.2, 226.1, 137, 504, 505, 506, 273, 278.1, 101; 375/267, 347, 200, 206, 348; 370/320, 342

[56] References Cited

U.S. PATENT DOCUMENTS

| 4,584,713 | 4/1986 | Bruckert et al. | 455/277.2 |
| 5,109,390 | 4/1992 | Gilhousen et al. | 455/506 |
| 5,241,701 | 8/1993 | Andoh | 455/277.1 |
| 5,361,404 | 11/1994 | Dent | 455/277.2 |
| 5,414,734 | 5/1995 | Marchetto et al. | 375/347 |
| 5,430,769 | 7/1995 | Patsiokas et al. | 375/347 |
| 5,561,673 | 10/1996 | Takai et al. | 455/277.2 |
| 5,642,377 | 6/1997 | Chung et al. | 375/206 |
| 5,663,990 | 9/1997 | Bolgiano et al. | 375/347 |
| 5,671,221 | 9/1997 | Yang | 370/320 |

OTHER PUBLICATIONS

TR 45, Mobil Station—Base Station Compatibility, Standard for Dual—Mode Wideband, Spread Spectrum Cellular System, PN–3118, Feb. 11, 1993, pp. i–xxxiv.

Performance of a Two–Branch Radiotelephone Selection Diversity Receiver by Bruce C. Eastmond and James a. Pautler, Motorola, Inc. Chicago Corp. R & D Center, pp. 164–171.

On The Opptimization Of Simple Switch Diversity Receivers by Mario A. Blanco of the IL Inst. of Tech., and Kenneth Zdunck of Motorola Communication Division, Schaumberg, IL.

*Primary Examiner*—Reinhard J. Eisenzopf
*Assistant Examiner*—Lester G. Kincaid
*Attorney, Agent, or Firm*—Kevin D. Kaschke; Paul J. Bartusiak

[57] ABSTRACT

A radio subscriber unit (102) has a diversity receiver apparatus (106) including a first antenna (114) and a second antenna (116). A first representation (158) and a second representation (160) of a composite radio frequency (RF) signal are received from the first antenna (114) and the second antenna (116), respectively. The composite radio frequency (RF) signal includes a desired RF signal (156) and interfering signals (166). The desired RF signal (156) includes at least one coded pilot signal (Ec). A ratio (Ec/Io) (142) of the at least one coded pilot signal (Ec) to an estimate of the composite RF signal (Io) is determined responsive to receiving at least one of the first representation of the composite RF signal (158) and the second representation of the composite RF signal (160). A selected state of the first antenna(114) and the second antenna (116) is controlled responsive to at least one of the ratio (Ec/Io) (142) and an integrated received signal strength indication (∫RSSI) of the composite RF signal.

20 Claims, 11 Drawing Sheets

METHOD FOR CONTROLLING A DIVERSITY RECEIVER APPARATUS IN A RADIO SUBSCRIBER UNIT

CROSS-REFERENCE TO RELATED APPLICATIONS

The present patents application is related to U.S. patent application having Ser. No. 08/564,460 and Ser. No. 08/564,464 both filed on the same date herewith and assigned to the assignee of the present invention.

FIELD OF THE INVENTION

The present invention relates generally to radio subscriber units and, more particularly, to a method for controlling a diversity receiver apparatus in a radio subscriber unit.

BACKGROUND OF THE INVENTION

Radio systems provide users of radio subscriber units with wireless communications. A particular type of radio system is a cellular radiotelephone system. A particular type of radio subscriber unit is a cellular radiotelephone subscriber unit, sometimes referred to as a mobile station. Cellular radiotelephone systems generally include a switch controller coupled to a public switched telephone network (PSTN) and a plurality of base stations. Each of the plurality of base stations generally defines a geographic region proximate to the base station to produce coverage areas. One or more mobile stations communicate with a base station that facilitates a call between the mobile station and the public switched telephone network. A description of a cellular radiotelephone system is described in the book "Mobile Cellular Communications Systems" by Dr. William C. Y. Lee, 1989.

Some mobile stations have diversity to improve the reception of communication signals sent from the base station. Diversity employs equipment redundancy or duplication to achieve an improvement in receiver performance under multipath fading conditions. Space diversity, in particular, employs two or more antennas that are physically spaced apart by a distance related to the wavelength. In a space diversity system, a transmitted signal travels by slightly different paths from the transmitter to the two antennas at the receiver. In addition, there may be reflected paths, where the transmitted signal received by each antenna has also traveled by different paths from the transmitter. Experience has shown that when the reflected path causes fading by interference with the transmitted signal, the two received signals may not be simultaneously affected to the same extent by the presence of multipath fading, because of the different paths. Although the path from the transmitter to one of the two antennas may cause phase cancellation of the transmitted and reflected path waves, it is less probable that multiple paths to the other antenna will cause phase cancellation at the same time. The probability that the two antennas are receiving exactly the same signal is called a correlation factor.

Known space diversity systems include switched antenna diversity (SAD), selection diversity (SD) and maximal ratio combining diversity (MRCD). Each diversity system includes a controller having an algorithm programmed therein for controlling the diversity system. A detailed comparison of these three diversity systems is described in "On The Optimization Of Simple Switched Diversity Receiver" by Zdunek et al, 1978 IEEE Canadian Conference on Communications and Power, Montreal, Canada and "Performance And Optimization Of Switched Diversity Receivers" by Zdunek et al, IEEE Transactions on Communications, December 1979. A brief description of these three diversity systems is now provided.

SAD employs two antennas coupled to a single receiver through a single pole, double throw radio frequency (RF) switch. A controller samples the signal received from each antenna to couple only one of the two antennas to the receiver at a time.

SD employs two antennas and two receivers, wherein each antenna is coupled to its own receiver. The receiver with the highest baseband signal to noise ratio (SNR) is selected to be the demodulated signal. SD provides improved performance over SAD because the signals produced by the receivers can be monitored more often than with SAD and suffer fewer switching transients. However, a weakness of both SAD and SD is that only one antenna is used at any instant in time, while the other is disregarded.

MRCD also employs two antennas and two receivers, wherein each antenna is coupled to its own receiver. MRCD seeks to exploit the signals from each antenna by weighting each signal in proportion to their SNRs and then summing them. Accordingly, the individual signals in each diversity branch are cophased and combined, exploiting all the received signals, even those with poor SNRs. However a disadvantage of MRCD is that MRCD is more difficult and complicated to implement than SAD or SD.

A particular type of cellular radiotelephone system employs spread spectrum signaling. Spread spectrum can be broadly defined as a mechanism by which the bandwidth occupied by a transmitted signal is much greater than the bandwidth required by a baseband information signal. Two categories of spread spectrum communications are direct sequence spread spectrum (DSSS) and frequency-hopping spread spectrum (FHSS). The essence of the two techniques is to spread the transmitted power of each user over such a wide bandwidth (1–50 Mhz) that the power per unit bandwidth, in watts per hertz, is very small.

Frequency-hopping systems achieve their processing gain by avoiding interference, whereas the direct sequence systems use an interference attenuation technique. For DSSS, the objective of the receiver is to pick out the transmitted signal from a wide received bandwidth in which the signal is below the background noise level. The receiver must know the carrier frequency signal, type of modulation, pseudorandom noise code rate, and phase of the code in order to do this, since signal to noise ratios are typically minus 15 to 30 dB. Determining the phase of the code is the most difficult. The receiver uses a process known as synchronization to determine the starting point of the code from the received signal in order to despread the required signal while spreading all unwanted signals.

The DSSS technique acquires superior noise performance, compared to frequency hopping, at the expense of increased system complexity. The spectrum of a signal can be most easily spread by multiplying it with a wideband pseudorandom code-generated signal. It is essential that the spreading signal be precisely known so that the receiver can demodulate (i.e. despread) the signal. Furthermore, it must lock onto and track the correct phase of the received signal within one chip time (i.e. a partial or subinteger bit period). At the receiving end, a serial search circuit is used. There are two feedback loops, one for locking onto the correct code phase and the other for tracking the carrier. For code phase locking, the code clock and carrier frequency generator in the receiver are adjusted so that the locally generated code moves back and forth in time relative to the incoming received code. At the point which produces a maximum at the correlator output, the two signals are synchronized, meaning that the correct code phase has been acquired. The second loop (carrier tracking loop) then tracks the phase and frequency of the carrier to ensure phase lock is maintained.

A cellular radiotelephone system using DSSS is commonly known as a Direct Sequence Code Division Multiple Access (DS-CDMA) system. Individual users in the system use the same RF frequency but are separated by the use of individual spreading code.

In a DS-CDMA system a forward channel is defined as a communication path from the base station to the mobile station, and a reverse channel is defined as a communication path from the mobile station to the base station. The forward channel operation of DS-CDMA may be greatly improved by adding rake fingers to the receiver of the mobile station. The performance improvement provided by these extra rake fingers can approach the performance of MRCD by optimally exploiting resolvable delay spread and soft handoff. Unfortunately, field tests have measured only a small percentage of time where there is significant resolvable delay spread and both theory and simulations have shown soft handoff enhancement to be over a very limited amplitude range of the signal. As a result, the forward channel suffers performance degradation with respect to the reverse channel which has antenna diversity and takes full advantage of all its fingers.

Not only is there reduced range in the forward channel but the quality of the channel is poorer because frame error rate (FER) occurrences are correlated. Whereas reverse channel errors are much more random in time resulting in higher quality speech sound. The fundamental reason for the correlation is the character of the fading channel and the sluggishness of the forward channel power control loop.

Coherent antenna combining could solve the range imbalance issue and go a long way to eliminate the FER correlation problems. But coherent antenna combining is typically avoided in mobile stations because of the cost of receiver duplication and especially in DS-CDMA mobile stations because of the high complexity of the receiver.

SAD can be a solution. SAD is required in Personal Digital Cellular (PDC) mobile stations. But, their time division multiple access (TDMA) access method allows an antenna decision to be made just prior to a serving time slot arrival. No switching is permitted within the time slot. The Ardis™ Portable Data Terminal uses switched diversity that operates within the message; but, it is ineffective at speeds above 10 MPH. This is because the traditional switch algorithm can't keep up with the fast fades.

Accordingly, there is a need for a mobile station having a method for controlling a diversity receiver apparatus in a radio subscriber unit that overcomes the disadvantages of the prior art and works well in DSSS systems.

DETAILED DESCRIPTION OF THE PREFERRED EMBODIMENTS

Three general embodiments described hereinbelow are first briefly summarized for the sake of organization and understanding. The three embodiments may be implemented independently or combined in any way to achieve a desired result. Thus, there are several possible combinations of the three general embodiments. Many more specific combinations are possible considering the particular features of each of the three general embodiments described hereinbelow.

A first general embodiment, described with reference to FIGS. 1–6, describes a radio subscriber unit including a switched antenna diversity receiver apparatus and a method for controlling the same. The radio subscriber unit includes a controller and the switched antenna diversity receiver apparatus having a first antenna, a second antenna, and a receiver. The controller selectively couples one of only the first antenna to the receiver, only the second antenna to the receiver, and both the first antenna and the second antenna to the receiver responsive to a received signal generated by the receiver.

A second general embodiment, described with reference to FIGS. 1–7, describes a method for controlling a diversity receiver apparatus in a radio subscriber unit. The radio subscriber unit includes a controller and the diversity receiver apparatus having a first antenna and a second antenna. The controller controls a selected state of the first antenna and the second antenna responsive to at least one of: a ratio (Ec/Io) of the coded pilot signal (Ec) to the received signal strength of all received signals (Io) and an integration of the received signal strength indication ($\int RSSI$) of the received signal.

A third general embodiment, described with reference to FIGS. 8–11, describes another method for controlling a diversity receiver in a radio subscriber unit. The diversity receiver receives either a first radio frequency (RF) signal modulated by a digital modulation method or a second RF signal modulated by an analog modulation method. In one embodiment, the controller controls the diversity receiver responsive to a first diversity algorithm when the diversity receiver receives the first RF signal modulated by the digital modulation method, and responsive to a second diversity algorithm when the diversity receiver receives the second RF signal modulated by the analog modulation method. In another embodiment, the controller controls the diversity receiver responsive to a first received information set when the diversity receiver receives the first RF signal modulated by the digital modulation method, and responsive to a second received information set when the diversity receiver receives the second RF signal modulated by the analog modulation method.

Figure 1:
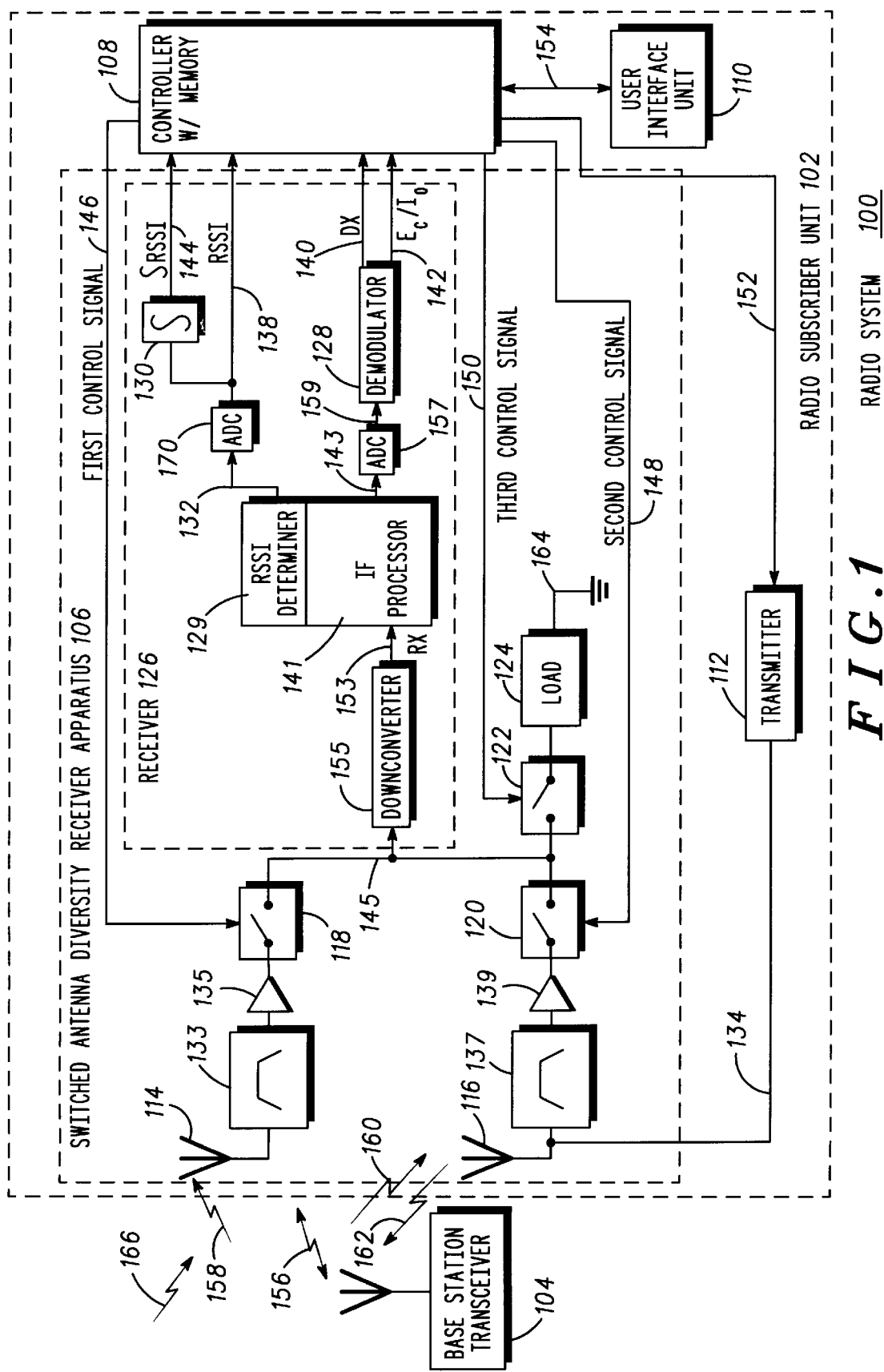
FIG. 1 illustrates a block diagram of a radio system including a first embodiment of a radio subscriber unit.

Beginning now with the figures, FIG. 1 illustrates a block diagram of a radio system 100. The radio system generally includes a radio subscriber unit 102 and a base station transceiver 104. The radio subscriber unit 102 generally includes a switched antenna diversity receiver apparatus 106, a controller 108, a user interface unit 110, and a transmitter 112. The switched antenna diversity receiver apparatus 106 generally includes a first antenna 114, a second antenna 116, a first switch 118, a second switch 120, a third switch 122, a load 124, and a receiver 126, a first bandpass filter 133, a first pre-amplifier 135, a second bandpass filter 137, and a second pre-amplifier 139. The receiver 126 generally includes a demodulator 128, an intermediate frequency (IF) processor 141 including a received signal strength (RSSI) determiner 129, an integrator 130, a downconverter 155, a first analog to digital converter (ADC) 157, and a second analog to digital converter (ADC) 170. The block diagram of the radio subscriber unit 102 is simplified in order to facilitate the understanding of the present invention. Practically, the radio subscriber unit 102 also includes many other blocks and connections, as is well known to those skilled in the art.

In the radio subscriber unit 102, the first antenna 114 is coupled to the first bandpass filter 133. The first bandpass filter 133 is coupled to the first pre-amplifier 135. The first pre-amplifier 135 is coupled to the first switch 118. The second antenna 116 is coupled to the second bandpass filter 137. The second bandpass filter 137 is coupled to the second pre-amplifier 139. The second pre-amplifier 139 is coupled to the second switch 120. The load 124 is coupled to the third switch 122. The first switch 118, the second switch 120, and the third switch 122 are each coupled together at a single point at line 145 at an input to the receiver 126. The first switch 118 receives a first control signal at line 146. The second switch 120 receives a second control signal at line 148. The third switch 122 receives a third control signal at line 150.

The receiver 126 receives a radio frequency (RF) signal at line 145. The received RF signal at line 145 is coupled to an input of the downconverter 155 for producing a received signal (Rx) at line 153. The received signal at line 153 is coupled to the IF processor 141. The IF processor 141 produces an IF signal at line 143 and a RSSI at line 132. The IF signal at line 143 is converted from an analog signal to a digital signal at line 159 by the A/D converter (ADC) 157. The demodulator 128 receives the digital signal at line 159 and produces a demodulated signal (Dx) at line 140. The demodulator 128 also produces a ratio (Ec/Io) at line 142 indicative of the pilot power (Ec) to all received signal power (Io). The second A/D converter (ADC) 170 converts the received signal at line 153 from an analog signal to a digital signal at line 138. The integrator 130 receives the digital RSSI at line 138 and produces an integrated RSSI (∫RSSI) at line 144. The RSSI at line 138, the demodulated signal (Dx) at line 140, the ∫RSSI at line 144, and the ratio (Ec/Io) at line 142 are provided to the controller 108.

The controller 108 is coupled to receive the RSSI at line 138, the demodulated signal (Dx) at line 140, the ∫RSSI at line 144, and the ratio Ec/Io at line 142. The controller 108 generates the first control signal at line 146, the second control signal at line 148, and the third control signal at line 150. The controller 108 generates information for transmission at line 152. The controller 108 transmits user interface information to the user interface unit 110 at line 154 and also receives user interface information from the user interface unit 110 at line 154.

The user interface unit 110 generally includes, for example, display, a keypad, an earpiece, a microphone, as is well known in the art.

The transmitter 112 is coupled to receive the information at line 152 and produces transmitted information at line 134 for transmission by the second antenna 116.

In operation, the radio system 100 generally operates as follows. The base station transceiver 104 communicates with the radio subscriber unit 102 over radio frequency (RF) channels. It is generally known that the radio subscriber unit 102 needs to be within a coverage area provided by the base station transceiver 104 to provide effective communication therebetween. The base station transceiver 104 transmits a radio frequency (RF) signal 156. The radio subscriber unit 102 receives a first representation 158 of the RF signal 156 and a second representation 160 of the RF signal 156. The radio subscriber unit 102 also generates a transmit signal 162 for receipt by the base station transceiver 154.

The radio system 100 generally describes any communication system operating over RF channels. Radio systems intended to be included within the scope of the present invention include, by example, cellular radiotelephone communication systems, two-way radio communication systems, and personal communication systems (PCS).

In the preferred embodiment, the radio system 100 is a cellular radiotelephone communication system. Types of cellular radiotelephone communication systems intended to be within the scope of present invention include, by example, Direct Sequence-Code Division Multiple Access (DS-CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, and Extended-TDMA (E-TDMA) cellular radiotelephone systems. GSM systems have been adopted across Europe and in many countries for the Pacific rim. GSM uses 200 kHz channels with 8 users per channel using TDMA, and has a vocoder rate of 13 kbits/s. NADC systems use 30 kHz channels, three users per channel, and have a vocoder rate of 8 kbits/s. E-TDMA also uses 30 kHz channels, but has 6 users per channel with a vocoder rate of 4 kbits/s.

In the preferred embodiment, the cellular radiotelephone communication system is a DS-CDMA cellular radiotelephone communication system. The standard for this system is disclosed in TIA/EIA, IS-95, Mobile Station-Base Station Compatibility Standard for Dual-Mode Wide Band Spread Spectrum Cellular System, published July 1993 (hereinafter referred to as the "IS-95 Standard"), herein incorporated by reference.

In the IS-95 standard, a nomenclature is given for the naming of data elements within the radio subscriber unit (i.e. the mobile station receiver). Table 1 below illustrates the timing relationships between various data elements in a CDMA radio subscriber unit 102. In the preferred embodiment, the RSSI output of the A/D converter 170 (see FIG. 1) are sampled at the chip rate while the ∫RSSI and the ratio Ec/Io inputs to the controller 108 (see FIG. 1) are sampled at a symbol period.

TABLE 1

| element | rate (seconds) | rate (symbols) | comments |
|---|---|---|---|
| chip | 1.2288 Mchip/s | | A Tx bit is called a "chip" |
| symbol | 19.2 ksym/s | 64 chips/symbol | Intermediate stage bits are "symbols" |
| bit | 9.6 kbit/s | 2 symbols/bit | Convolutional coder is rate 1, |
| PCG | 800 PCG/s | 24 symbols/PCG | Power Control Group |
| frame | 50 Hz | 192 bits/frame | Primary data is a "bit" |

DS-CDMA is a technique for spread-spectrum multiple-access digital communications that creates channels through the use of unique code sequences. DS-CDMA signals can be and are received in the presence of high levels of interference. The practical limit of signal reception depends on the channel conditions, but DS-CDMA reception described in the aforementioned IS-95 Standard can take place in the presence of interference that is 18 dB larger than the signal for a static channel. Typically the system operates with a lower level of interference and dynamic channel conditions.

The DS-CDMA cellular radiotelephone communication system may be divided into sectors or coverage areas as is well know in the art. In a DS-CDMA system the frequencies for communication are reused in every sector of every cell, and most of the interference on a given frequency as seen by the radio subscriber unit 102 is from cells outside that which the radio subscriber unit 102 resides. The residual interference on a given frequency seen by the radio subscriber unit 102 is from the user traffic from within the same cell on the same frequency from time-delayed (reflected) rays where each ray is a composite signal 156 from the base station transceiver 104 arriving at antennas 114 and 116 via multiple paths each with approximately the same delay.

A DS-CDMA base station transceiver communicates with the radio subscriber unit 102 with a signal having a basic data rate of 9600 bits/s. The signal is then spread to a transmitted bit rate, or chip rate, of 1.2288 Mhz. Spreading consists of applying digital codes to the data bits that increase the data rate while adding redundancy to the DS-CDMA system. The chips of all the users in that cell are then added to form a composite digital signal. The composite digital signal is then transmitted using a form of quadrature phase shift keying (QPSK) modulation that has been filtered to limit the bandwidth of the signal.

When a transmitted signal is received by the radio subscriber unit 102, the coding is removed from the desired signal, returning it to a data rate of 9600 bit/s. When the coding is applied to the other users' codes, there is no despreading; the received signal maintains the 1.2288 Mhz band width. The ratio of transmitted bits or chips to data bits is the coding gain. Coding gain for an DS-CDMA system according to the IS-95 Standard is 128, or 21 dB. Because of this coding gain of 21 dB, interference of up to 18 dB above the signal level (3 dB below the signal strength after coding gain) can be tolerated for a static channel.

The radio subscriber unit 102 is adapted for compatibility with the type of radio system 100. Therefore, in accordance with the preferred embodiment, the radio subscriber unit 102 is a cellular radio subscriber unit. The radio subscriber unit 102 may take many forms that are well known in the art, such as, for example, a vehicular mounted unit, a portable unit, or a transportable unit. According to the preferred embodiment, the radio subscriber unit 102 is a DS-CDMA radio subscriber unit designed to be compatible with the DS-CDMA cellular radiotelephone system as described in the aforementioned IS-95 Standard.

The operation of the first general embodiment of the radio subscriber unit 102 is now generally described. In general, the radio subscriber unit 102 includes the first antenna 114, second antenna 116, the receiver 126, and the controller 108. The first antenna is adapted to receive the first representation 158 of the RF signal 156. The second antenna is adapted to receive the second representation 160 of the RF signal 156. The receiver 126, selectively coupled to the first antenna 114 and the second antenna 116, generates the received signal (Rx) at line 153 responsive to receiving at least one of the first representation 158 of the RF signal 156 from the first antenna 114 and the second representation 160 of the RF signal 156 from the second antenna 116. The controller 108, coupled to the receiver 126, selectively couples to the receiver 126, responsive to the received signal at line 153, one of: only the first antenna 114, only the second antenna 116, and both the first antenna 114 and the second antenna 116.

In the preferred embodiment, the switched antenna diversity receiver apparatus 106 in the radio subscriber unit 102 has two antennas 114 and 116. However, more than two antennas may be incorporated into a diversity receiver apparatus in the radio subscriber unit 102 as is well known to those skilled in the art. The first antenna 114 and the second antenna 116 generally include any antenna that can receive and/or transmit RF signals. In the preferred embodiment, the first antenna 114 and the second antenna 116 are dipole antennas having a wave length of one-half lamda. The proper location, spacing, orientation, etc., of the first antenna 114 and the second antenna 116, within the radio subscriber unit 102 is well known to one of ordinary skill in the art. The first antenna 114 may be located in a flap element of a portable telephone as is well known to one of ordinary skill in the art.

In the preferred embodiment, the second antenna 116 is considered the primary antenna because it is coupled to both the switched antenna diversity receiver apparatus 106 and the transmitter 112. The first antenna 114 is considered an auxiliary (or alternate) antenna that enables the receiver diversity function. The transmitter 112 is not coupled to the first antenna 114.

The first representation 158 of the RF signal 156 and the second representation 160 of the RF signal 156 provide identical information to the radio subscriber unit 102. However, because of the spatial relationship of the first antenna 114 and the second antenna 116, the RF signal received at one antenna may be both delayed and attenuated with respect to the RF signal received at the other antenna. The switched antenna diversity receiver apparatus 106 takes advantage of these differences in order to improve the reception of the radio subscriber unit 102.

The receiver 126 is generally of the type designed to process RF signals. An example of the receiver 126 is generally disclosed in the book "Digital Communications" by John Proakis, McGraw-Hill, 1989, or "Theory of Spread Spectrum Communications—A Tutorial" by Raymond L. Pickhotz et al., IEEE Transactions on Communications, vol. com-30, pp 855–884, 1992. Many functions of the receiver 126 may be implemented in discrete parts or as an integrated circuits (IC) as is well known in the art.

The analog to digital (A/D) converter 157 samples the IF signal at line 143 at a multiple (8×) of the chip rate. In the preferred embodiment, the energy of the received signal at line 153 has been split into in-phase (I) and quadrature-phase (Q) components which is normally over-sampled by an A/D converter pair. An example of an A/D converter suitable for use in the preferred embodiment is a CDX1172 manufactured by Sony Corp.

The demodulator 144 is generally well known to those skilled in the art. In the preferred embodiment, the demodulator 144 includes a despread operation, I-Q demodulation, synchronization, rake fingers, de-interleaving, convolutional decoding of the data and the ratio Ec/Io determination. In the preferred embodiment, the demodulator 144 is a digital DS-CDMA demodulator embodied within an application specific integrated circuit (ASIC) as described in "CDMA Mobile Station Modem ASIC", *Proceedings of the IEEE* 1992 *Custom Integrated Circuits Conference*, section 10.2, pages 1–5; and "The CDMA Digital Cellular System an ASIC Overview", *Proceedings of the IEEE* 1992 *Custom Integrated Circuits Conference*, section 10.1, pages 1–7.

The second A/D converter 170 produces samples at the chip rate. An example of the second A/D converter 170 suitable for use in the preferred embodiment is a CDX1175 manufactured by Sony corp. The RSSI data at line 138 may be determined using only one or both of the I-Q components of the received RF signal 145.

The integrator 130 provides for multi-sample smoothing of the RSSI data at line 138. It can be performed by dedicated hardware, as shown, or by a software algorithm in the controller 108.

The controller 108 is generally a microcomputer such as a microprocessor or a digital signal processor (DSP). The controller 108 may be, for example, a MC68332 microcontroller or a MC56156 DSP manufactured and available from Motorola, Inc. The controller 108 is typically separate from the receiver 126. However, the controller 108 and the receiver 126 may be combined to form an integral unit, such as an IC.

The radio subscriber unit 102 further includes the first switch 118 and the second switch 120. The first switch 118, coupled to the first antenna 114, the receiver 126, and the controller 108, selectively couples the first antenna 114 to the receiver 126 responsive to the first control signal at line 146. The second switch, coupled to the second antenna 116, the receiver 126, and the controller 108, selectively couples the second antenna 116 to the receiver 126 responsive to the second control signal at line 148. The controller 108 is coupled to the first switch 118 and the second switch 120 and generates the first control signal at line 146 and the second control signal at line 148 responsive to the received signal at line 153. The controller 108 controls the first switch 118 via the first control signal at line 146 and the second switch 120 via the second control signal at line 148 to selectively couple to the receiver 126 one of: only the first antenna 114, only the second antenna 116, and both the first antenna 114 and the second antenna 116.

In the preferred embodiment, the first switch 118, the second switch 120 and the third switch 122 are typically field effect transistors (FETs) formed in an integrated circuit (IC). The switching of the FETs is done by controlling the FETs as is well known in the art. As is typical with switch antenna diversity receiver arrangements, the FETs in the receive path cause some loss of receiver sensitivity due to their insertion loss. But, the transmit (Tx) path is not affected because there are no switches in the transmit path.

In the preferred embodiment, the bias of the first pre-amplifier 135 and the bias of the second pre-amplifier 139 are also controlled by the controller 108 (control lines not shown) at the same time as the first switch 118 and the second switch 120, respectively. The pre-amplifiers are biased off when the corresponding switch, in series with the pre-amplifier, is opened. This helps reduce current drain and improve isolation when the corresponding antenna is not selected.

Although the first switch 118, the second switch 120, and the third switch 122 are represented as single pole single throw switches, hard switching is not necessary in order to operate the switched antenna diversity receiver apparatus 106. The first switch 118, the second switch 120, and the third switch 122 may alternatively be attenuators controlled by the first control signal at line 147, the second control signal at line 149, and third control signal at line 151. A typical attenuation value that may be used for the attenuators is 20 dB. Thus, the selected state of the first antenna 114, the second antenna 116, and the load 124 may be accomplished by varying the amount of attenuation at line 132, line 134, and line 136 respectively.

The selective coupling of the first antenna 114 and the second antenna 116 to the receiver are defined as selected states. In the preferred embodiment, there are three selected states. In the preferred embodiment, the first selected state occurs when only the first antenna 114 is coupled to the receiver 126. In the preferred embodiment, the second selected state occurs when only the second antenna 114 is coupled to the receiver 126. In the preferred embodiment, the third selected state occurs when both the first antenna 114 and the second antenna 116 are coupled to the receiver 126. Of course, the description of the selected states is arbitrary and not limited to the assigned antenna configurations just defined.

An advantageous feature provided by the radio subscriber unit 102 is the three selected states of the first antenna 114 and the second antenna 116. In the prior art, only two selected states are possible. In the prior art the two selected states are typically implemented using a single pole, double throw switch controlled by a controller. In the prior art, one selected state is defined occurs only a first antenna is coupled to a receiver, and another selected state is occurs when only a second antenna is coupled to the receiver. The prior art does not disclose a third selected state occurring when both the first antenna and the second antenna are coupled to the receiver, as disclosed in the present application.

Further, in the preferred embodiment, the controller 108 uses a complex set of decisions, set out herein with reference to FIGS. 2–6, to control the selected states of the first antenna 114 and the second antenna 116. The prior art traditionally uses a simple level of received signal comparison between the first antenna 114 and the second antenna 116 (with perhaps some hysteresis added).

Still further, in the preferred embodiment, the controller 108 controls the selected states of the first antenna 114 and the second antenna 116 responsive to the ∫RSSI at line 144 and/or the ratio Ec/Io at line 142. The controller 108 uses these three parameters to optimize alternate antenna sampling as well as when to choose an alternate antenna configuration as a serving antenna configuration. The prior art does not disclose controlling the selected states of the first antenna 114 and the second antenna 116 responsive to the ∫RSSI at line 144 and/or the ratio Ec/Io at line 142. The advantages of controlling the selected states of the first antenna 114 and the second antenna 116 responsive to the ∫RSSI at line 144 and/or the ratio Ec/Io at line 142 are described with reference to FIGS. 2–6 below.

Operating the switched antenna diversity receiver apparatus 106 with both the first antenna 114 and the second antenna 116 is particularly advantageous when receiving a spread spectrum signal, such as the DS-CDMA signal. In a DS-CDMA signal the same information, intended for the radio subscriber unit 102, is present at both the first antenna 114 and the second antenna 116. Because of this characteristic of the DS-CDMA signal, the signal-to-noise ratio of the received signal (Rx) at line 153 will likely improve when the antennas are simultaneously connected. Conditions under which improvement occurs include signal levels within 10 dB of each other and not in phase opposition.

The third selected state of the first antenna 114 and the second antenna 116 provides an advantage not realized by the prior art. The prior art also did not use the equivalent of the ratio Ec/Io. Adequate Ec/Io while in the third selected state indicates that the antennas may both remain simultaneously connected even though this may not be the optimum state. This is discussed further with reference to FIGS. 2–6.

The radio subscriber unit 102 further includes the load 124 and the third switch 122. The load 124 is coupled to signal ground potential at line 164. The third switch, coupled to the load 124, the receiver 126, and the controller 108, selectively couples the load 124 to the receiver 126 responsive to the third control signal 150. The controller 108 selectively couples to the receiver 126, responsive to the received signal (Rx) at line 153, one of: only the first antenna 114 and the load 124, only the second antenna 116 and the load 124, and both the first antenna 114 and the second antenna 116.

In the preferred embodiment, the first selected state occurs when only the first antenna 114 and the load 124 is coupled to the receiver 126. In the preferred embodiment, the second selected state occurs when only the second antenna 114 and the load 124 is coupled to the receiver 126. In the preferred embodiment, the third selected state occurs when both the first antenna 114 and the second antenna 116 are coupled to the receiver 126. The load 124 is not coupled to the receiver 126 in the third selected state.

The load 124 has a predetermined impedance. In the preferred embodiment the load forms a predetermined lossy termination. An example of the load 124 is a resistor. In the preferred embodiment, the load has an impedance of 100 ohms.

It is desirable to design the receiver 126 with a predetermined input impedance that is matched to a predetermined output impedance at line 145. Therefore, it is desirable that the predetermined output impedance at line 145 be substantially constant without regard to the selection between three selected states of the first antenna 114 and the second antenna 116. This is accomplished by first designing the receiver 126 with a predetermined input impedance matched to the predetermined output impedance at line 145 when the first switch 118 and the second switch 120 are both coupled to the receiver 126 in the third selected state. In the preferred embodiment, the predetermined input impedance of the receiver 126 is 50 ohms. In the preferred embodiment, the predetermined output impedance at line 145 when the first switch 118 and the second switch 120 are both coupled to the receiver 126 in the third selected state is 50 ohms.

Ignoring the load 124 for a moment, the output impedance at line 145 when the first antenna 114 and the second antenna 116 are in either the first selected state or the second selected state (i.e., when only one antenna is coupled to the receiver 126) is not the same as the output impedance at line 145 when the first antenna 114 and the second antenna 116 are in the third selected state (i.e., when both the first antenna 114 and the second antenna 116 are coupled to the receiver 126). In the preferred embodiment, the predetermined output impedance at line 145 is 100 ohms when only one of the first switch 118 and the second switch 120, without the load 124, is coupled to the receiver 126 in the first and second selected states, respectively.

The load 124 is then added to be in parallel with either the first antenna 114 or the second antenna 116 when only one antenna is selected to be coupled to the receiver 126. The impedance of the load 124 is chosen so that the impedance of the load 124 in parallel with the output impedance at line 145 of either the first switch 118 or the second switch 120 is substantially the same as the output impedance at line 145 of both the first switch 118 or the second switch 120 in parallel. In the preferred embodiment, the predetermined output impedance at line 145 when only one of the first switch 118 and the second switch 120, with the load 124, is coupled to the receiver 126 in the first and second selected states, respectively, is 50 ohms.

Selectively coupling the load 124 to the receiver 126 when either the first antenna 114 is selected or when the second antenna 116 is selected and not selectively coupling the load 124 to the receiver 126 when both the first antenna 114 and the second antenna 116 are selected maintains a constant predetermined output impedance at line 145. Thus, the predetermined input impedance of the receiver 126 is matched to the predetermined output impedance at line 145.

The prior art does not disclose switching in a load when only one antenna is selected. The prior art does not disclose the third selected state (i.e., when both the first antenna and the second antenna selected at the same time). Since the predetermined output impedance in the prior art is already the same when either only one antenna or only another antenna is selected, the prior art has not addressed the problem of maintaining a constant predetermined output impedance to a receiver.

In the preferred embodiment, the controller 108 couples both the first antenna 114 and the second antenna 116 to the receiver 126 for a period of time before selectively coupling either only the first antenna 114 or the second antenna 116 to the receiver 126. This activity by the controller 108 may be summarized by the phrase "make before break switching". The purpose of this type of switching is to reduce the transient effects of switching antennas and to allow time to evaluate the possible benefit of using both antennas in parallel. In the preferred embodiment, the typical "make time" is a symbol period.

In the preferred embodiment, the RF signals 158 and 160 are composite RF signals including a desired RF signal 156 and interfering signals represented by signal 166. In the preferred embodiment, the desired signal is a spread spectrum signal. In particular, the spread spectrum signal is a direct sequence spread spectrum (DSSS) signal adapted for a CDMA communication system. A general description of the desired RF signal 156 is disclosed in the IS-95 Standard mentioned hereinabove.

The desired RF signal 156 includes a data signal and at least one coded pilot signal. The data signal contains the information intended for the radio subscriber unit 102. The data signal corresponds to the demodulated signal (Dx) at line 140. The coded pilot signal is used to synchronize the receiver 126. The coded pilot signal (Ec) is one part of the ratio Ec/Io determined at line 142.

The interfering signals 166 may come from a variety of sources such as, for example, delayed rays of RF signal 156, transmissions from other DS-CDMA base stations and spurious energy from other radio transmissions.

A summary of the preferred operation of the second general embodiment of the radio subscriber unit 102 is now provided. The first antenna 114 receives the first representation 158 of the spread spectrum RF signal 156. The second antenna 116 receives the second representation 160 of the spread spectrum RF signal 156. The receiver, selectively coupled to the first antenna 114 and the second antenna 116, generates a received signal at line 153, including at least one ratio Ec/Io at line 142, responsive to receiving at least one of the first representation 158 of the spread spectrum RF signal 156 from the first antenna 114 and the second representation 160 of the spread spectrum RF signal 156 from the second antenna 116. The first switch 118, coupled to the first antenna 114, the receiver 126, and the controller 108 selectively couples the first antenna 114 to the receiver 126 responsive to the first control signal at line 146. The second switch 120, coupled to the second antenna 116, the receiver 126, and the controller 108, selectively couples the second antenna 116 to the receiver 126 responsive to the second control signal at line 148. The load 124 has a predetermined impedance. The third switch 122, coupled to the load 124, the receiver 126, and the controller 108, selectively couples the load 124 to the receiver 126 responsive to the third control signal at line 150. The controller 108, coupled to the first switch 118, the second switch 120, and the third switch 122, generates the first control signal at line 146, the second control signal at line 148, and the third control signal at line 150 responsive to the ratio Ec/Io at line 142.

The controller 108 controls the first switch 118 responsive to the first control signal at line 146, the second switch 120 responsive to the second control signal at line 148, and third switch 122 responsive to the third control signal at line 150 to selectively couple to the receiver 126 one of: only the first antenna 114 and the load 124, only the second antenna 116 and the load 124, or both the first antenna 114 and the second antenna 116.

The controller 108 controls the first switch 118, the second switch 120, and the third switch 122 to selectively couple both the first antenna 114 and the second antenna 116 to the receiver 126. For a period a time before selectively coupling either the first antenna 114 and the load 124 or the second antenna 116 and the load 124 to the receiver 126, the controller 108 couples both the first antenna 114 and the second antenna 116 to the receiver 126.

The three selected states of the first antenna 114 and the second antenna 116 are controlled by the controller 108 responsive to the ∫RSSI at line 144 and/or the ratio Ec/Io at line 142. Details of the operation of the controller 108 responsive to its input signals are now further described with reference to FIGS. 2–6.

Figure 2:
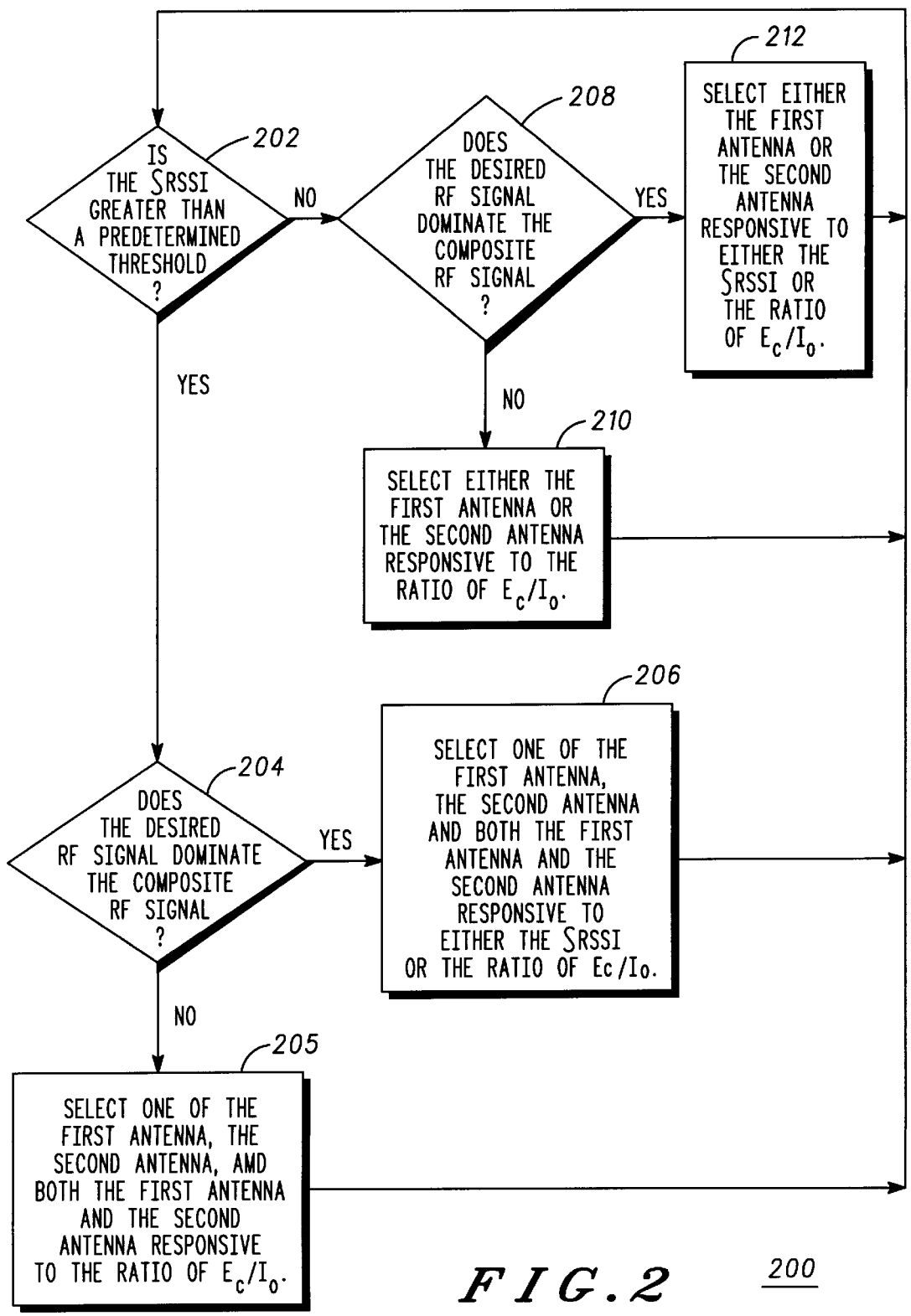
FIG. 2 illustrates a flowchart describing the operation of the radio subscriber unit of FIG. 1.
Figure 3:
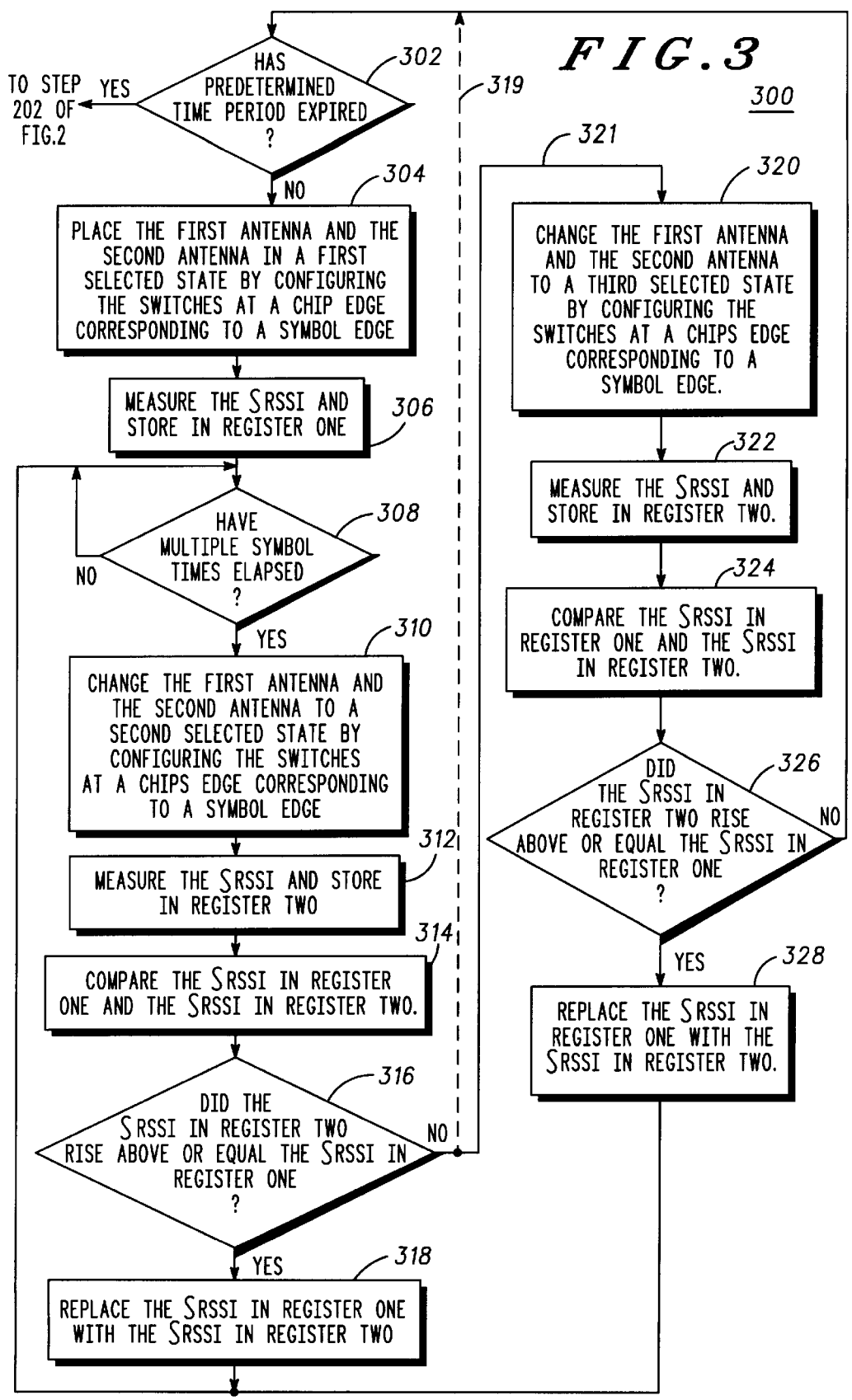
FIG. 3 illustrates a flowchart further describing a portion of the flowchart of FIG. 2.
Figure 4:
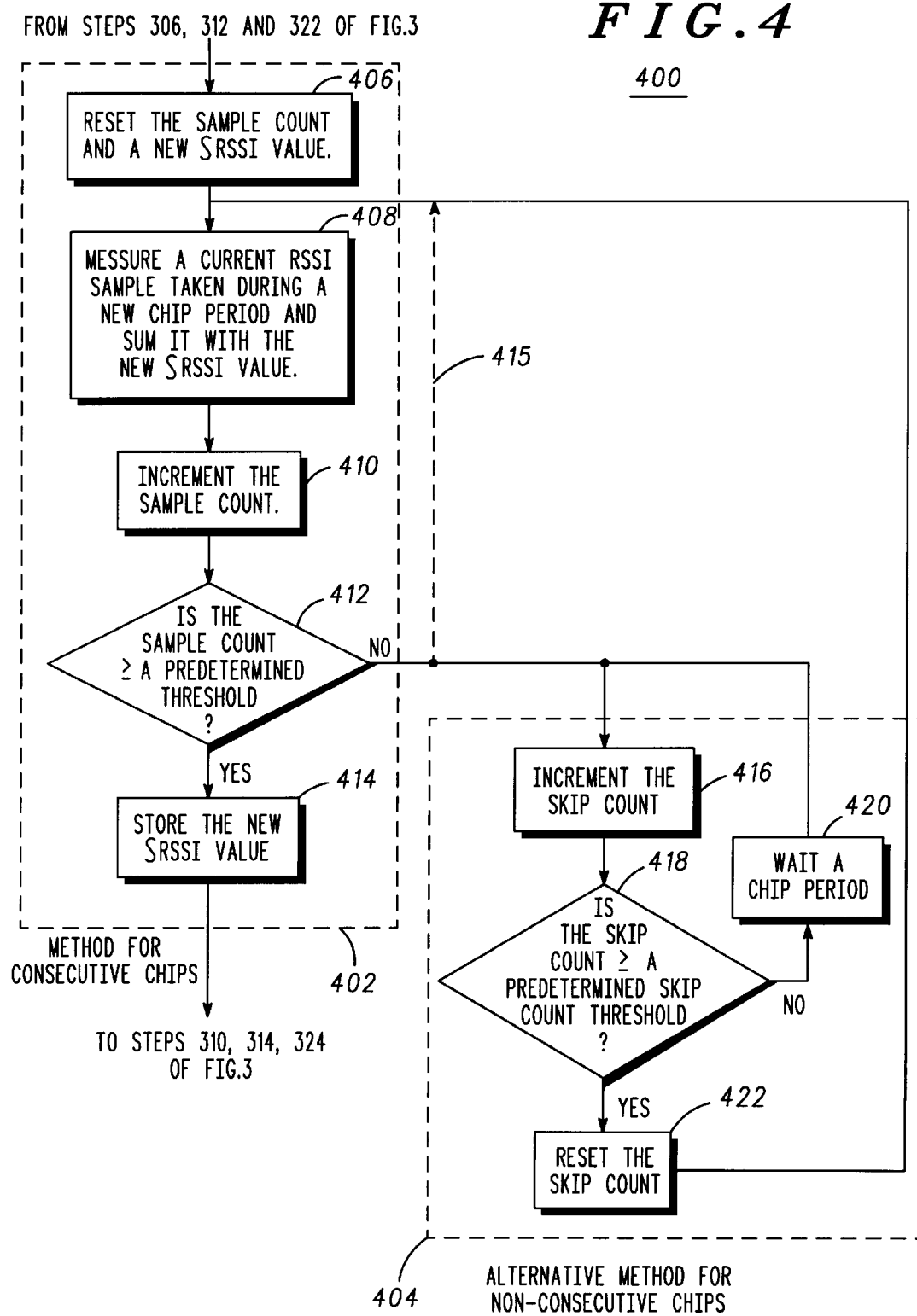
FIG. 4 illustrates a flowchart further describing a portion of the flowchart of FIG. 3.
Figure 5:
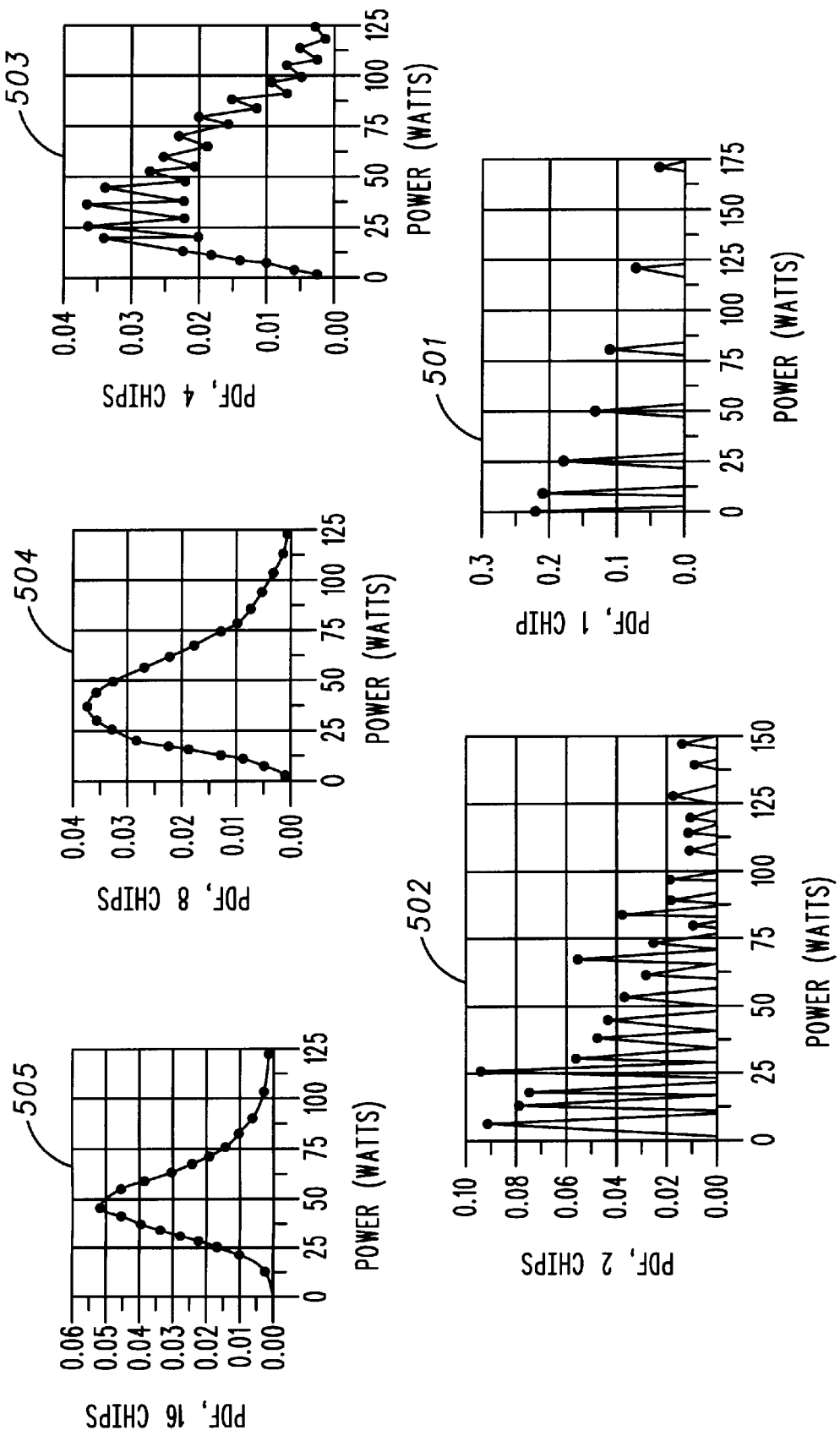
FIG. 5 illustrates graphs of probability distribution functions at various chip integration levels in support of the description of the flowchart of FIG. 4.
Figure 6:
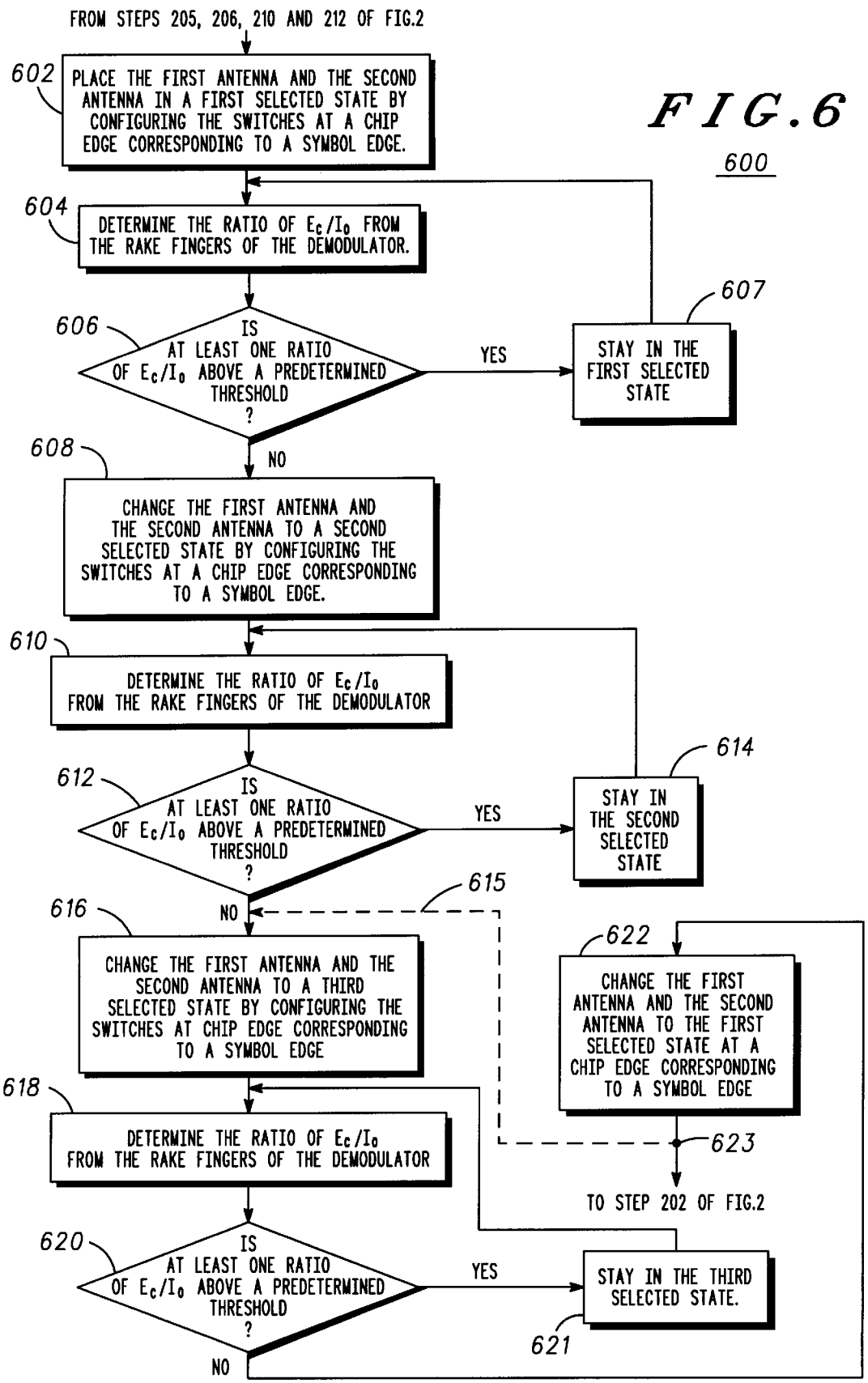
FIG. 6 illustrates a flowchart further describing another portion of the flowchart of FIG. 2.

The flowcharts illustrated in FIGS. 2, 3, 4 and 6 are embodied within read only memory (ROM) (not shown) associated with the controller 108. FIG. 2 illustrates decisions made by the controller 108 that generally consider a level of the ∫RSSI relative to a predetermined threshold, the level of the desired RF signal relative to the composite RF signal, the number of selected antenna states, and the level of the ratio (Ec/Io) and/or the level of the ∫RSSI. FIG. 3 illustrates decisions made by the controller 108 that generally consider when to change the selected states of the antennas based on the level of the ∫RSSI at various points in time. FIG. 4 illustrates decisions made by the controller 108 that generally consider how to measure the level of the ∫RSSI. FIG. 5 provides support for determining how the level of the ∫RSSI is measured. FIG. 6 illustrates decisions made by the controller 108 that generally consider when to change the selected states of the antennas based on the level of the ratio (Ec/Io) relative to a predetermined threshold.

FIG. 2 illustrates a flowchart 200 describing the operation of the radio subscriber unit 200 of FIG. 1. The flowchart 200 comprises a collection of steps 202, 204, 205, 206, 208, 210, and 212 defining a predetermined set of operating conditions for the controller 108.

At step 202, a determination is made if an ∫RSSI is greater than a predetermined threshold. In the preferred embodiment, the predetermined threshold is 6 dB. The predetermined threshold is empirically set to represent a level above the sensitivity of receiver 126.

At step 202, when the ∫RSSI is determined to be much greater than the receiver sensitivity, for example, greater than 6 dB, the first antenna 114 and the second antenna 116 can be left in parallel most of the time. In the preferred embodiment, the third selected state occurs when both the first antenna 114 and the second antenna 116 are connected in parallel to the receiver 126. Changing from a parallel antenna state to single antenna switching is done when there is a drop in ∫RSSI which would indicate that the thermal noise threshold has been reached due to either a simultaneous fade on both the first antenna 114 and the second antenna 116, or a signal cancellation between the first antenna 114 and the second antenna 116.

If the determination at step 202 is positive, then, at step 204, a determination is made whether the desired RF signal 156 dominates the composite RF signal 158 or 160. In the preferred embodiment, the desired RF signal 156 dominates the composite RF signal 158 or 160 when the demodulator 128 detects the desired RF signal 156 at levels 10 dB higher than other detected signals. The purpose of the determination at step 204 is to provide an indication of whether the radio subscriber unit 102 is in a multipath fading or a soft hand-off condition versus a flat fading condition. Multipath fading, soft hand-off and flat fading conditions are well understood to those skilled in the art. The multipath fading or a soft hand-off condition occurs when the desired RF signal does not dominate the composite RF signal. The flat fading condition occurs when the desired RF signal 156 does dominate the composite RF signal 158 or 160.

If the determination at step 204 is negative, then, at step 205, the controller 108 selects either the first antenna 114 or the second antenna 116, or both the first antenna 114 and the second antenna 116 responsive to a ratio of Ec/Io. The reason that only the ratio of Ec/Io is used and not ∫RSSI is that ∫RSSI does not represent the magnitude of the desired RF signal 156. Further details of step 205 are discussed with reference to FIG. 6.

If the determination at step 204 is positive, then, at step 206, the controller 108 selects either the first antenna 114, the second antenna 116, or both the first antenna 114 and the second antenna 116 responsive to either the ∫RSSI or the ratio of Ec/Io. The reason that either the ∫RSSI or the ratio of Ec/Io may be used is that ∫RSSI now substantially represents the magnitude of the desired RF signal 156 and Ec/Io is always representative of the magnitude of the desired RF signal 156. The details of step 206 regarding the selected state of the antennas 114 and 116 responsive to the ∫RSSI are described in detail with reference to FIGS. 3–5. The details of step 206 regarding the selected state of the antennas responsive to the ratio of Ec/Io are described in detail with reference to FIG. 6.

Returning now to step 202, if the determination at step 202 is negative, then, at step 208, determination is made whether the desired RF signal 156 dominates the composite RF signal 158 or 160. This step is essentially the same as previously described in step 204.

At step 202, when the ∫RSSI is determined to be close to thermal noise (No), for example, less than 6 dB, only one antenna at a time should be connected to the receiver 126. In the preferred embodiment, a first selected state connects only first antenna 114 to the receiver 126 and a second selected state connects only second antenna 116 to the receiver 126. This insures that the added thermal noise (No) from the two antennas in parallel will not degrade reception. In this case, antenna switching is synchronized to symbol edges and there is no practical reason to do a "make before break". However, there should be no significant period when no antenna is connected. Otherwise, valuable information could be lost. Therefore, there should be near simultaneous switching between a first and second selected antenna states.

If the determination at step 208 is negative, then, the controller selects either the first antenna 114 or the second antenna 116 responsive to the ratio of Ec/Io. Step 210 is the same as step 205, with the exception that step 210 does not have a third selected antenna state (i.e. parallel antennas). The details of step 210 regarding the selected states of the antennas responsive to the ratio Ec/Io are described in detail with reference to FIG. 6.

If at step 208, the determination is positive, then, at step 212, the controller 108 selects either the first antenna 114 or the second antenna 116 responsive to either the ∫RSSI or the ratio Ec/Io. Step 212 is the same as step 206, with the exception that step 210 does not have a third selected antenna state (i.e. parallel antennas). The details of step 212 regarding the selected antenna state responsive to the ∫RSSI are described in detail with reference to FIGS. 3–5. The details of step 212 regarding the selected states of the antennas responsive to the ratio Ec/Io are described in detail with reference to FIG. 6.

Upon the completion of steps 205, 206, 210, and 212, the flowchart returns to step 202 wherein another determination is made whether the ∫RSSI is greater than the predetermined threshold.

FIG. 3 illustrates a flowchart 300 further describing a portion of the flowchart 200 of FIG. 2. In particular, the flowchart of FIG. 3 expands upon each of the steps 206 and 212 of FIG. 2 to describe how the controller 108 selects the state of the antennas responsive to the ∫RSSI. The overall goal of the flowchart in FIG. 3 is to cause the controller 108 to select the state of the antennas producing the highest measured ∫RSSI value.

FIG. 3 illustrates that three selected antenna states at steps 304, 310 and 320 may be selected by the controller 108. If the controller 108 only needs to select between two selected antenna states, at steps 304 and 310, for example, the flow takes the path indicated by dotted line 319 between steps 316 and 302. A brief reference to FIG. 2 shows that only two selected antenna states are used in steps 210 and 212. If the controller 108 needs to select between three selected antenna states, at steps 304, 310 and 312, for example, the flow takes the path indicated by line 321 between steps 316 and 320. A brief reference to FIG. 2 shows that three selected antenna states are used in steps 205 and 206.

The flowchart begins at step 302. At step 302 a determination is made whether a predetermined time period has expired. The purpose of the predetermined time period is to cause the check for the dominance of the desired RF signal 156 to be evaluated on a periodic basis. In the preferred embodiment, the predetermined time period has a duration of one second.

If the determination at step 302 is positive, the predetermined time period of one second has expired and the flowchart returns to step 202 of FIG. 2.

If the determination at step 302 is negative, then, at step 304, the controller places the first antenna 114 and the second antenna 116 in a first selected state by configuring the first switch 118, the second switch 120 and the third switch 122. In the preferred embodiment, the switches are configured at an edge of a chip corresponding to an edge of a symbol. In step 206 the first selected state can be any of the three possible antenna combinations. Further, when step 212 occurrs, the first selected state excludes placing antenna 114 and antenna 116 in parallel.

At step 306, the controller 108 measures and stores in memory register one (not shown) the ∫RSSI. The memory may be, for example, random access memory (RAM) associated with the controller 108.

At step 308, a determination is made whether multiple symbol times have elapsed. The purpose of monitoring the symbols times is to provide a delay between successive measurements of the ∫RSSI when the selected antenna state changes. If there were no delay, the successive measurements of the ∫RSSI could be so similar that no benefit would be gained by taking a second measurement. However, if the delay were too long, the first measurement could become to old in time to be of any practical use for improving reception.

In general, sampling an alternate antenna state is a function of ∫RSSI. When the ∫RSSI is sufficiently high, the alternate antenna need not be sampled. As the ∫RSSI drops, the alternate antenna should be increasingly sampled until a maximum rate, for example, 1920 samples/s, is reached.

The alternate antenna should be sampled sufficiently often enough to account for Rayleigh fades. This implies that a slowly varying channel need not be sampled as often and more samples can be averaged to determine a composite sample. In this way, the sample duration is least likely to affect reception.

If the determination at step 308 is negative, then the flow returns to step 308 until the multiple symbol times have elapsed. If the determination at step 308 is positive, the flow continues to step 310.

At step 310 the controller 108 changes the first antenna 114 and the second antenna 116 to a second selected state by configuring the first switch 118, the second switch 120, the third switch 122. In the preferred embodiment, the switches are configured at an edge of a chip corresponding to an edge of a symbol. In step 206, the second selected state can be any of the three possible antenna combinations. Further, when step 212 occurs, the second selected state excludes placing antenna 114 and antenna 116 in parallel.

At step 312 the controller measures and stores in memory in register two (not shown) the ∫RSSI. The memory may be, for example, random access memory (RAM) associated with the controller 108. The controller 108 now has a second measurement of the ∫RSSI to make a comparison with the first measurement of the ∫RSSI.

At step 314 the controller compares the ∫RSSI in register two to the ∫RSSI in register one and stores the result in memory (not shown). The result of the comparison provides an indication of which selected antenna state would provide better reception.

At step 316 a determination is made whether the measured ∫RSSI in register two did rise above or equal to the measured ∫RSSI in register one. If the determination at step 316 is positive, at step 318 the controller replaces the measured ∫RSSI in register one with the measured the ∫RSSI at time T2. The purpose of the replacement is to load the most recent measurement of the ∫RSSI into a known memory location for subsequent comparison by a new measurement of the ∫RSSI. Then the flow returns to step 308 wherein a determination is made whether multiple symbol times have elapsed. Thus, if the measured ∫RSSI did not decrease, the antenna configuration remains in the second selected state as long as the measured ∫RSSI does not decrease with each measurement.

If, at step 316, the determination is negative, the flow continues to step 320 when three selected antenna states are desired and, alternatively, to step 302 when only two selected antenna states are desired. The dotted line 319 indicates the alternative flow path between step 318 and step 302. The line 321 indicates the flow path between step 318 and step 320.

If a third selected antenna state is desired, the flow continues from step 318 to step 320 wherein the controller 108 changes the first antenna 114 and the second antenna 116 to the third selected state. The third selected state can be any of the three possible antenna configurations. At step 320, the change to the third selected state occurs at a chip edge corresponding to a symbol edge. This portion of step 320 is the same as the portion of the description for steps 304 and 310 above.

At step 322 the controller 108 measures and stores in memory (not shown) the ∫RSSI in register two. The controller 108 now has a new measurements of the ∫RSSI to make a comparison with the previous measurement.

At step 324, the controller compares and stores in memory (not shown) the measured ∫RSSI in register two to the measured ∫RSSI in register one. The result of the comparison provides an indication of which selected antenna state would provide better reception.

At step 326, the controller 108 determines whether the measured ∫RSSI in register two rose above or equaled the measured ∫RSSI in register one. If the determination at step 326 is positive, then at step 328, the controller 108 replaces the measured ∫RSSI in register one with the measured ∫RSSI in register two. The purpose of the replacement is to load the highest measurement of the ∫RSSI into a known memory location for subsequent comparison by a new measurement of the ∫RSSI. The flow continues to step 308 wherein a determination is made whether multiple symbol times have elapsed. If the measured ∫RSSI did increase, the antenna configuration returns to make a measurement of the ∫RSSI in the second selected state.

If, at step 326 the determination is negative, then the flow continues to step 302 wherein a determination is made whether the predetermined time period has elapsed.

At steps 304, 310 and 320 the change to the selected state of the antennas occurs at a chip edge corresponding to a symbol edge. The controller coordinates the switching instant with a chip transition of the strongest rake finger (not shown in the demodulator 128). This minimizes ringing effects in an intermediate filter (IF) filter of the receiver 126. U.S. Pat. No. 4,584,713 teaches bit/switch coordination and recognizes that the transient ringing is a function of the bandwidth of the intermediate frequency (IF) filter and the delay from the number of poles of the IF filter. The symbol edge and chip edge detection circuitry (not shown in the receiver 126 and the controller 108) involves synchronizing the antenna switch time with a time advance of a chip clock found in the demodulator 128. The amount of advance is a function of the time delay between the antenna terminals to the demodulator 128 (i.e., modulo of the chip period).

FIG. 4 illustrates a flowchart 400 further describing a portion of the flowchart 300 of FIG. 3. In particular, the flowchart 400 of FIG. 4 describes how the controller 108 measures and stores in memory the ∫RSSI at each of the steps 306, 312, and 322 of FIG. 3.

The flowchart 400 of FIG. 4 generally includes a group of steps designated as step 402 and a group of steps generally designated as step 404. Step 402 includes steps 406, 408, 410, 412, and 414. Step 402 generally illustrates a method for measuring and storing the ∫RSSI for consecutive chips. Step 404 generally includes steps 416, 418, 420, and 422. The step 404 generally describes the method for measuring and storing the ∫RSSI for non-consecutive chips. Dotted line 415 designates the flow path taken between steps 412 and 408 when consecutive chips are measured. Otherwise, flow path 417 is taken between steps 412 and 416 when non-consecutive chips are measured.

Referring now to step 406, the controller 108 resets the sample count and the new ∫RSSI value. The sample count is a measure of the number of RSSI samples in the current ∫RSSI measurement. In the preferred embodiment, the reset sample count is zero and the reset new RSSI value is zero.

At step 408, the controller measures a current RSSI sample taken during a chip period and sums it with the new ∫RSSI value.

At step 410, the controller 108 increments the sample count value. In the preferred embodiment, the sample count is incremented by one.

At step 412, a determination is made whether the sample amount is greater than or equal to a predetermined threshold. In the preferred embodiment, the predetermined threshold is thirty two sample counts.

If the determination at step 212 is positive, then, at step 414, the new ∫RSSI value is stored in memory (not shown). Thus, the ∫RSSI value is determined at steps 408, 410 and 412 by summing individual samples of the ∫RSSI over a plurality of samples. From step 414, the flow continues to step 310, 314, or 324 of FIG. 3.

If the determination at step 412 is negative, then the flow continues via path 415 to step 408 when a measurement of consecutive chips is desired. If a measurement of the ∫RSSI for non-consecutive chips is desired, the flow continues to step 416 via flow path 417.

At step 416, the controller increments a skip count. A skip count is a measure of the number of chips to be skipped.

At step 418, a determination is made whether the skip count is greater than or equal to a predetermined skip count threshold. In the preferred embodiment, the predetermined skip count threshold is ten.

If the determination at step 418 is negative, then, at step 420, the controller waits a chip period and returns to step 416 wherein the controller 108 again increments the skip count.

If the determination at step 418 is positive, then, at step 422, the controller resets the skip count and the flow returns to step 408. In the preferred embodiment, the skip count value, when reset, is zero.

Thus, steps 416, 418, 420 and 422 together provide a chip counting loop that determines how many chips period are skipped between successive RSSI measurements.

FIG. 5 illustrates graphs of probability distribution functions 501, 502, 503, 504, and 505 at various chip rates in support of the description of the flowchart 400 in FIG. 4. FIG. 5 generally illustrates a sampling strategy used in the flowchart of FIG. 4. Graphs 501–505 each represent probability distribution functions of five different sample integrations where the abscissa's unit is power in watts. Graph 501 represents a 1-chip sample integration. Graph 502 represents a 2-chip sample integration. Graph 503 represents a 4-chip sample integration. Graph 504 represents a 8-chip sample integration. Graph 505 represents a 16-chip sample integration. The single chip sample plot reflects the fact that the example restricts the voltage to odd integers.

The following provides a practical discussion of a sample strategy used by the radio subscriber unit 102. Sample duration versus the number of samples is a tradeoff that needs consideration to achieve a practical design. In the preferred embodiment, the RF signal 156 transmitted from the base station transceiver 104 consists of a sum of independent fixed voltages of differing amplitude and polarity plus a DC voltage (i.e., the pilot) significantly stronger than any other individual voltage. The result is approximately a gaussian amplitude probability disability function (PDF) offset by the DC voltage. For example, the DC voltage offset appears as a peak of about 0.05 at about 40 watts in graph 505. Decreasing the number of chips used in the integration degrades the probability that ∫RSSI has been measured accurately as shown in graphs 504, 503, 502, and 501.

So long as the channel has not changed very much between samples, the required integration may be realized by a combination of averaging different samples and increasing the sample interval. For example, an integration of sixteen separated chips are equivalent to an integration of sixteen consecutive chips. Also, a sixty four chip integration would be derived from sixty four chip samples on consecutive or alternate symbol boundaries.

There are occasions where the signal on the alternate antenna is much noisier and an extended sampling interval causes a degradation in frame error rate. This problem can be essentially bypassed by decreasing the sampling interval. Typically, the alternate antenna may be sampled for extremely short time intervals (on the order of a chip sample). By example, consider the Io digitized sample power at the output of the downconverter 155 of FIG. 1. The downconverter 155 is approximately matched to an 0.81 μs chip of the RF signal 156. Now, considering a worst case scenario of 7 dB required Eb/No, 21 dB processing gain and 1 W traffic channel Tx power out of 25 W total, the mean sample S/N is 7−21+25:1=0 dB. Therefore, the mean chip sample is almost always a positive S/N. However, the instantaneous chip sample power is a variable and exhibits very low chip to chip correlation. Thus, a single chip sample may be too noisy as may be subsequent integration of samples. To overcome this problem, the sample interval may be extended to more symbols. An important technique is to straddle symbol boundaries to minimize the per symbol impairment.

If the sample interval is on the order of a few chips, the entire sample interval may be blanked from the symbol demodulator 128 with only a small degradation in receiver performance. This is especially effective because the total energy contains switching transients and the alternate antenna may be quite noisy.

When only one antenna is coupled to the receiver and an ∫RSSI measurement is to be made, a make before break connection is preferred in sampling the alternate antenna. This may degrade S/N by up to 3 dB but does not introduce switching transients particularly if the alternate signal is low. However, by adding the two signals together a null could result under specific conditions of phase and amplitude.

When there is a significant amount of delay spread, due either to the channel itself, a soft hand off (HO) region or combination of both, the chip sample or RSSI estimate may not be a good indicator of signal fading. Here the sample may need to be a symbol in duration, and the measured parameter may need to be the ratio Ec/Io.

A practical discussion of the sample rate is now provided by the following discussion. An alternate antenna state is sampled periodically. The sampling may be gated on when the serving signal drops below a S/N threshold of ∫RSSI or ratio Ec/Io. The radio subscriber unit 102 can arrive at an estimate of its S/N via the parameters: Ec/Io, amount of delay spread as derived from finger activity and searcher reports and amount of hand off (HO), again as derived from rake finger activity and searcher reports. The estimated S/N should be an indicator of whether or not alternate antenna sampling should occur. Of course, a simple rule is to sample at a minimum rate at all times and at a higher rate when the S/N falls below a threshold.

A sample rule might be that when the serving antenna S/N<threshold=>sample alternate antenna every $10^{th}$ symbol (1920 samples per second). The sample rate can be as high as one sample/symbol (19200 s/s) or even higher. As discussed earlier, the benefit is of high sample rates is that they can be averaged to reduce the per-sample variation.

In any event, with such a high sample rate available, the switch diversity should be able to follow flat Rayleigh fading (worst case), even at highway speeds. Thus a reasonably close approximation to optimum switched diversity should be achieved. Typical worst case Doppler frequencies should be less than 100 Hz (@75 MPH & 894 MHz, Doppler is 75×0.894×1.49). At 1920 samples per second, there are 20 samples per minimum fade period which is enough time to decide to switch to the other antenna.

It is relatively simple to get an estimate of the fade rate from the data and to make the sample rate a direct function of the fade rate. The sample rate could vary from 96 to 1920 samples/s depending on the fade rate.

Thus, the ability to follow the signal peaks at much higher speeds than a non-CDMA radio subscriber unit marks a major difference from traditional switched diversity methods.

FIG. 6 illustrates a flowchart 600 further describing another portion of the flowchart 200 of FIG. 2. In particular, the flowchart 600 provides further details of steps 205, 206, 210, and 212 of the flowchart 200 in FIG. 2 regarding the controller's selection of the selected antenna state responsive to the ratio Ec/Io. If the controller 108 only needs to select between two selected antenna states, at steps 602 and 608, for example, the flow takes the path indicated by dotted line 615 between steps 612 and step 202 of FIG. 2. A brief reference to FIG. 2 shows that only two selected antenna states are used in steps 210 and 212. If the controller 108 needs to select between three selected antenna states, at steps 602, 608 and 622, for example, the flow takes the path indicated by line 623 between steps 622 and step 202 of FIG. 2. A brief reference to FIG. 2 shows that three selected antenna states are used in steps 205 and 206.

At step 602, the controller places the first antenna 114 and the second antenna 116 in the first selected state by configuring the first switch 118, the second switch 120, and the third switch 122. When representing steps 205 or 206, the first selected state can be any of the three possible antenna combinations. Further, when steps 210 or 212 are used, the first selected state excludes placing antenna 114 and antenna 116 in parallel. In the preferred embodiment, the changes are made at the chip edge corresponding to the symbol edge. Changing the selected state of the antennas at a chip edge is discussed hereinabove with reference to FIG. 3.

At step 604, the demodulator 128 determines the ratio of Ec/Io from its rake fingers. Referring briefly to FIG. 1, Ec/Io is provided at line 142 for each of the rake fingers.

At step 606, the determination is made whether any of the ratios Ec/Io is above a predetermined threshold which is set to maintain a desired maximum frame error rate (FER). In the preferred embodiment, the maximum FER is 1% and the predetermined threshold is approximately −14 dB. New Ec/Io information is available after every symbol period.

If the determination at step 606 is positive, then, at step 607, the controller 108 maintains the first antenna 114 and the second antenna 116 in the first selected state. From step 607, the flow returns to step 604 wherein the ratio Ec/Io is again determined from the rake fingers of the demodulator 128. Thus, the selected state of the antennas will remain in the first selected state until the all the ratios Ec/Io drop below the predetermined threshold.

If the determination at step 606 is negative, then, at step 608, the controller changes the first antenna 114 and second antenna 116 to the second selected state by configuring the first switch 118, the second switch 120, and the third switch 122. When representing steps 205 or 206, the second selected state can be any of the three possible antenna combinations and when steps 210 or 212 are used, the second selected state excludes placing antenna 114 and antenna 116 in parallel. In the preferred embodiment, the changes are made at the chip edge corresponding to the symbol edge. Changing the selected state of the antennas at a chip edge is discussed hereinabove with reference to FIG. 3.

At step 610, the controller again determines the ratios Ec/Io from the rake fingers of the receiver 126 as in step 604.

At step 612, a determination is made whether at least one ratio Ec/Io is above the predetermined threshold. Step 612 performs a similar function to step 606 wherein, for example, the predetermined threshold is approximately −14 dB.

If the determination at step 612 is positive, then, at step 614, the controller 108 keeps the first antenna 114 and the second antenna 116 in the second selected state. The flow from step 614 then returns to step 610 wherein the controller again determines the ratio of Ec/Io from the rake fingers of the demodulator 128. Thus, the selected state of the antennas will remain in the second selected state until all the ratios Ec/Io drop below the predetermined threshold.

If the determination at step 612 is negative, then the flow returns to step 202 of FIG. 2 via path 615 when only two selected states are desired. The controller 108 selects between only two selected states in the flowchart 200 of FIG. 2 at steps 210 and 212.

If the determination at step 612 is negative, then the flow continues to step 616 when the controller 108 selects between three selected states of the first antenna 114 and the second antenna 116. In the flowchart 200 of FIG. 2, the controller 108 selects between three selected states of the antennas 114 and 116 at steps 205 and 206.

At step 616 the controller 108 changes the first antenna 114 and the second antenna 116 to a third selected state by configuring the first switch 118, the second switch 120, and the third switch 122. When representing steps 205 or 206, the third selected state can be any of the three possible antenna combinations. In the preferred embodiment, the change to the third selected state is made at the chip edge corresponding to the symbol edge. Changing the selected state of the antennas at a chip edge is discussed hereinabove with reference to FIG. 3.

At step 618 the controller again determines the ratio Ec/Io from the rake fingers of demodulator 128 as in steps 604 and 610.

At step 620 a determination is made whether the ratio of Ec/Io is above the predetermined threshold. The determination at step 620 is similar to the determinations already made at steps 606 and 612.

If the determination at step 620 is positive, then, at step 621, the controller 108 keeps the first antenna 114 and the second antenna 116 in the third selected state. The flow then continues from step 621 back to step 616 where the controller again determines the ratio of Ec/Io from the rake fingers of demodulator 128.

If the determination at step 620 is negative, then, at step 622, the controller changes the first antenna 114 and the second antenna 116 to the first selected state. In the preferred embodiment, the change occurs at the chip edge corresponding to the symbol edge. Changing the selected state of the antennas at a chip edge is discussed hereinabove with reference to FIG. 3. The flow continues from step 622 to step 202 of FIG. 2.

The second general embodiment, described with reference to FIGS. 1–6 and the following FIG. 7, describes a method for controlling a diversity receiver apparatus in a radio subscriber unit. The radio subscriber unit includes a controller and the diversity receiver apparatus having a first antenna and a second antenna. The controller controls a selected state of the first antenna and the second antenna responsive to at least one of: a ratio Ec/Io of a coded pilot signal Ec to an estimate of a received signal strength indication RSSI of composite RF signal Io, and/or an integration of the RSSI (∫RSSI) of the received signal.

Figure 7:
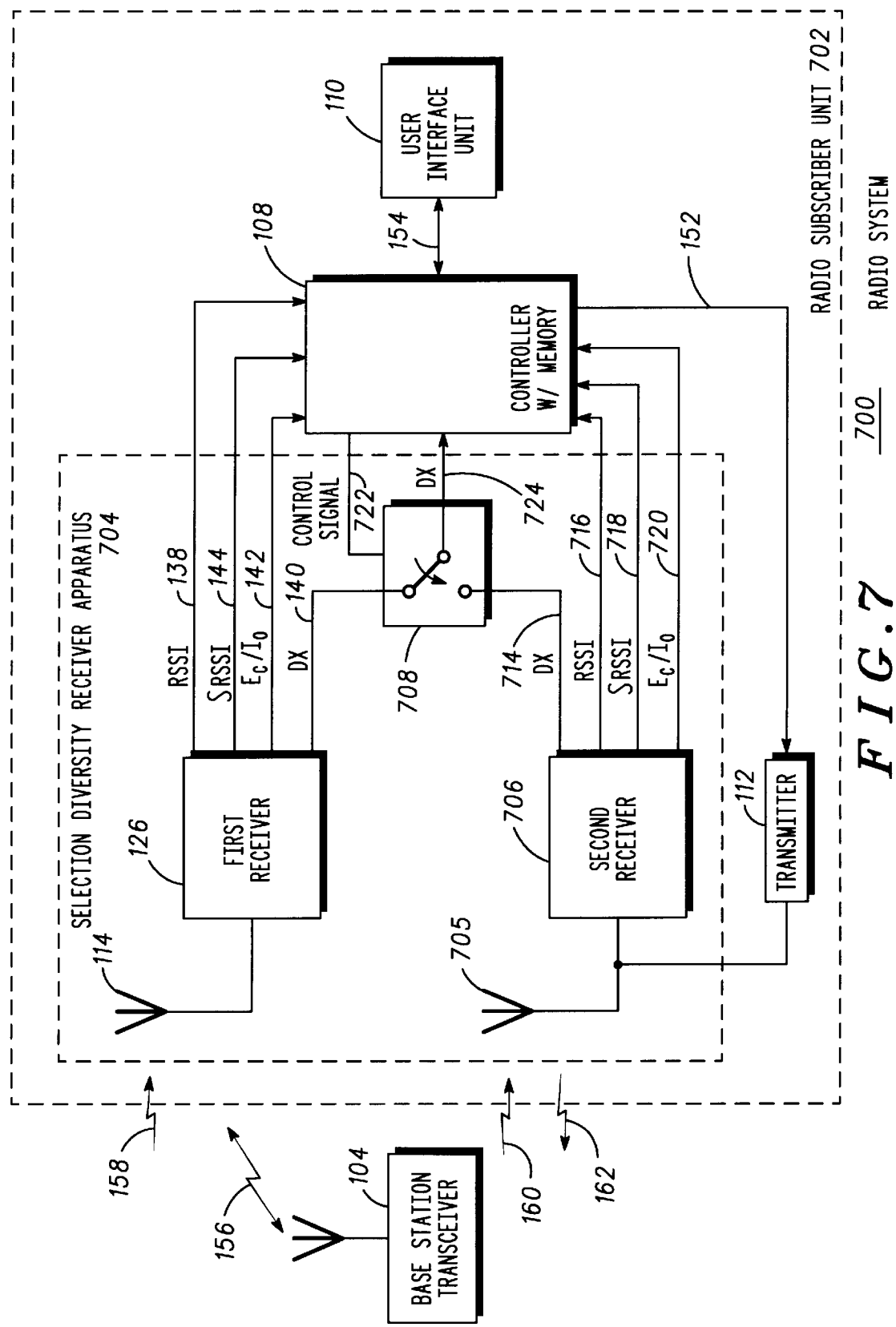
FIG. 7 illustrates a block diagram of a radio system including a second embodiment of a radio subscriber unit as an alternative embodiment to the first embodiment radio subscriber unit of FIG. 1.

FIG. 7 illustrates a block diagram of a radio system 700 including a second embodiment of a radio subscriber unit 702. Generally, the radio subscriber unit 702 in FIG. 7 is the same as the radio subscriber unit 102 in FIG. 1 except that the diversity receiver apparatus in the radio subscriber unit 702 is a selection diversity receiver apparatus 704. Whereas, the diversity receiver apparatus in the radio subscriber unit 102 is a switched antenna diversity receiver apparatus 106. Thus, all common elements between FIG. 1 and FIG. 7 are labeled with the same reference numbers and no further description will be given for those reference numbers. FIG. 7 is presented to illustrate that the same principles illustrated in the switched antenna diversity receiver apparatus 106 of FIG. 1, as supported by FIGS. 2–6, also apply to the selection diversity receiver apparatus 704 of FIG. 7.

The selection diversity receiver apparatus 704 generally includes the first antenna 114, the second antenna 116, and first receiver 126 (each shown in FIG. 1) as well as a second receiver 706 and a switch 708. The second receiver 706 generally includes the same elements as the first receiver 126, as shown in FIG. 1. The second receiver 706 produces a demodulated signal at line 714, and a RSSI at line 716, an ∫RSSI at line 718, and a ratio Ec/Io at line 720. The operation of the second receiver 706 is the same as the operation of the first receiver 126, as described in FIG. 1. Therefore, no additional explanation is given here.

In addition to the signals received from receiver 126, the controller 108 receives the RSSI at line 716, the ∫RSSI at line 718, and the ratio Ec/Io at line 720. The switch receives at a first terminal the demodulated signal (Dx) at line 140 from the first receiver 126 and at a second input terminal the demodulated signal (Dx) at line 714 from the second receiver 706. The switch 708 also receives a control signal at line 722 from the controller 108. The control signal 722 controls whether the demodulated signal at line 140 from the first receiver 126 or the demodulated signal at line 714 from the second receiver 706 is routed to the controller at line 724. Therefore, in operation the controller 108 controls the selection diversity receiver apparatus 704 responsive to the ratio of Ec/Io, the ∫RSSI, or both the ratio of Ec/Io and the ∫RSSI.

The operation of the radio subscriber unit 702 responsive to the ratio Ec/Io is now described. The first receiver 126 generates a first received signal at line 153 (see FIG. 1) including at least one ratio Ec/Io at line 142 responsive to receiving the first representation 158 of the composite RF signal 156 from the first antenna 114. The second receiver 706 generates a second received signal (not shown) including at least one ratio Ec/Io at line 720 responsive to receiving the second representation 160 of the composite RF signal 156 from the second antenna 116. The controller 108 then selects either the first demodulated signal at line 140 or the second demodulated signal at line 714 responsive to at least one of the first ratio Ec/Io and the second ratio Ec/Io. Thus, the radio subscriber unit 702 is operable to control the selection diversity receiver apparatus 704 responsive to the ratio Ec/Io.

Next, the operation of the radio subscriber unit 702 responsive to the ∫RSSI is described. The controller measures a first RSSI at line 138 of the composite RF signal 156 responsive to receiving the first representation 158 of the composite RF signal 156. The controller also measures a second RSSI at line 716 of the composite RF signal 156 responsive to receiving the second representation 160 of the composite RF signal 156. The integrator 130 of the first receiver 126 integrates the first RSSI of the composite RF signal 156 over a plurality of the chips to produce a first ∫RSSI of the composite RF signal 156. The integrator 712 of the second receiver 706 integrates the second RSSI of the composite RF signal 156 over a plurality of the chips to produce a second ∫RSSI at line 718 of the composite RF signal 156. The controller 108 selects either the first demodulated signal at line 140 or the second demodulated signal at line 714 responsive to at least one of the first ∫RSSI at line 144 of the composite RF signal 156 and the second ∫RSSI at line 718 of the composite RF signal 156.

The third general embodiment, now described with reference to FIGS. 8–11, describes another method for controlling a diversity receiver apparatus in a radio subscriber unit. The diversity receiver receives either a first radio frequency (RF) signal modulated by a digital modulation method or a second RF signal modulated by an analog modulation method. In one embodiment, the controller controls the diversity receiver responsive to a first diversity algorithm when the diversity receiver receives the first RF signal modulated by the digital modulation method, and responsive to a second diversity algorithm when the diversity receiver receives the second RF signal modulated by the analog modulation method. In another embodiment, the controller controls the diversity receiver responsive to a first received information set when the diversity receiver receives the first RF signal modulated by the digital modulation method, and responsive to a second received information set when the diversity receiver receives the second RF signal modulated by the analog modulation method.

Figure 8:
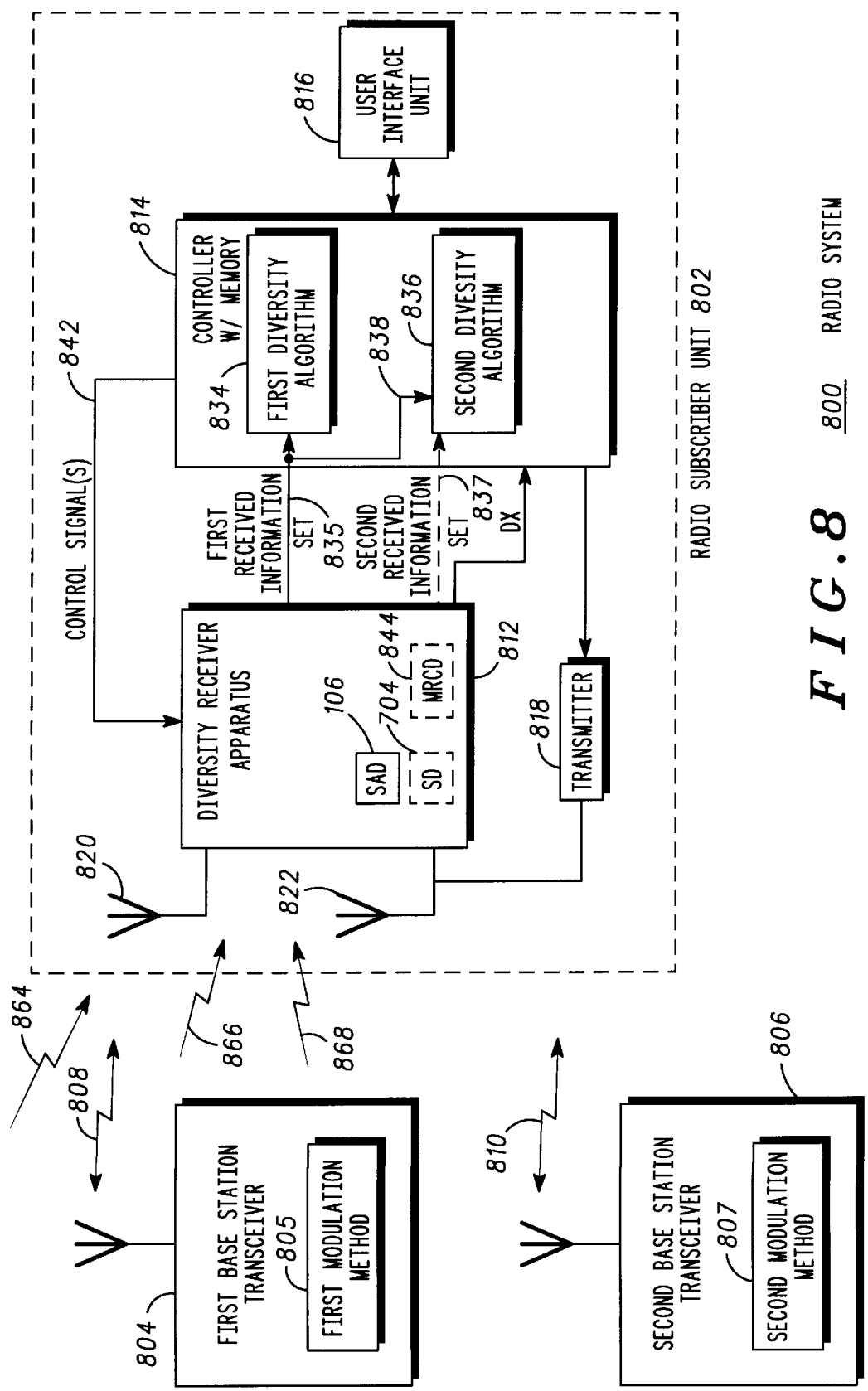
FIG. 8 illustrates a block diagram of a radio system including a third embodiment of a radio subscriber unit.
Figure 9:
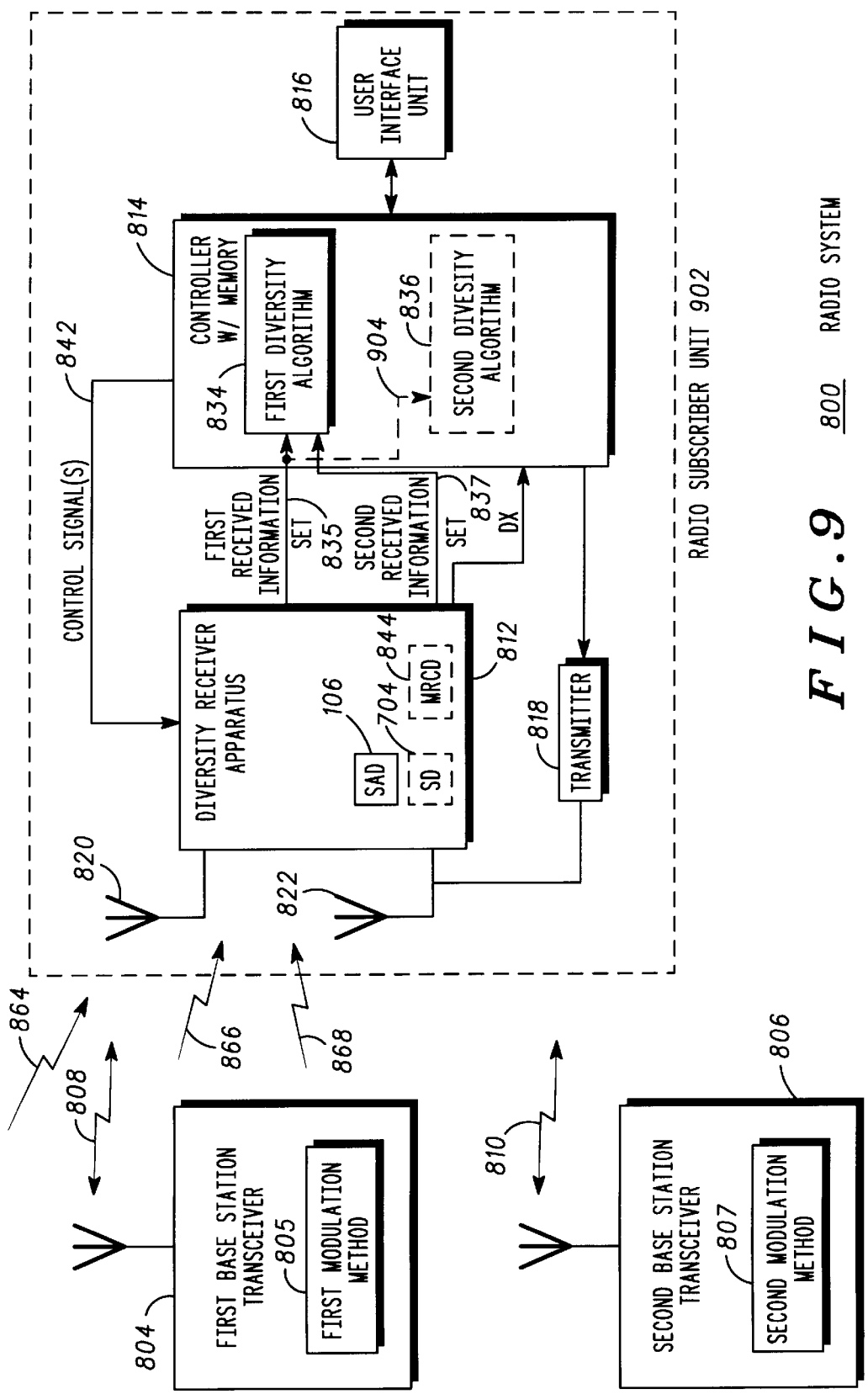
FIG. 9 illustrates a block diagram of a radio system including a fourth embodiment of a radio subscriber unit as an alternative embodiment to the third embodiment of the radio subscriber unit of FIG. 8.
Figure 10:
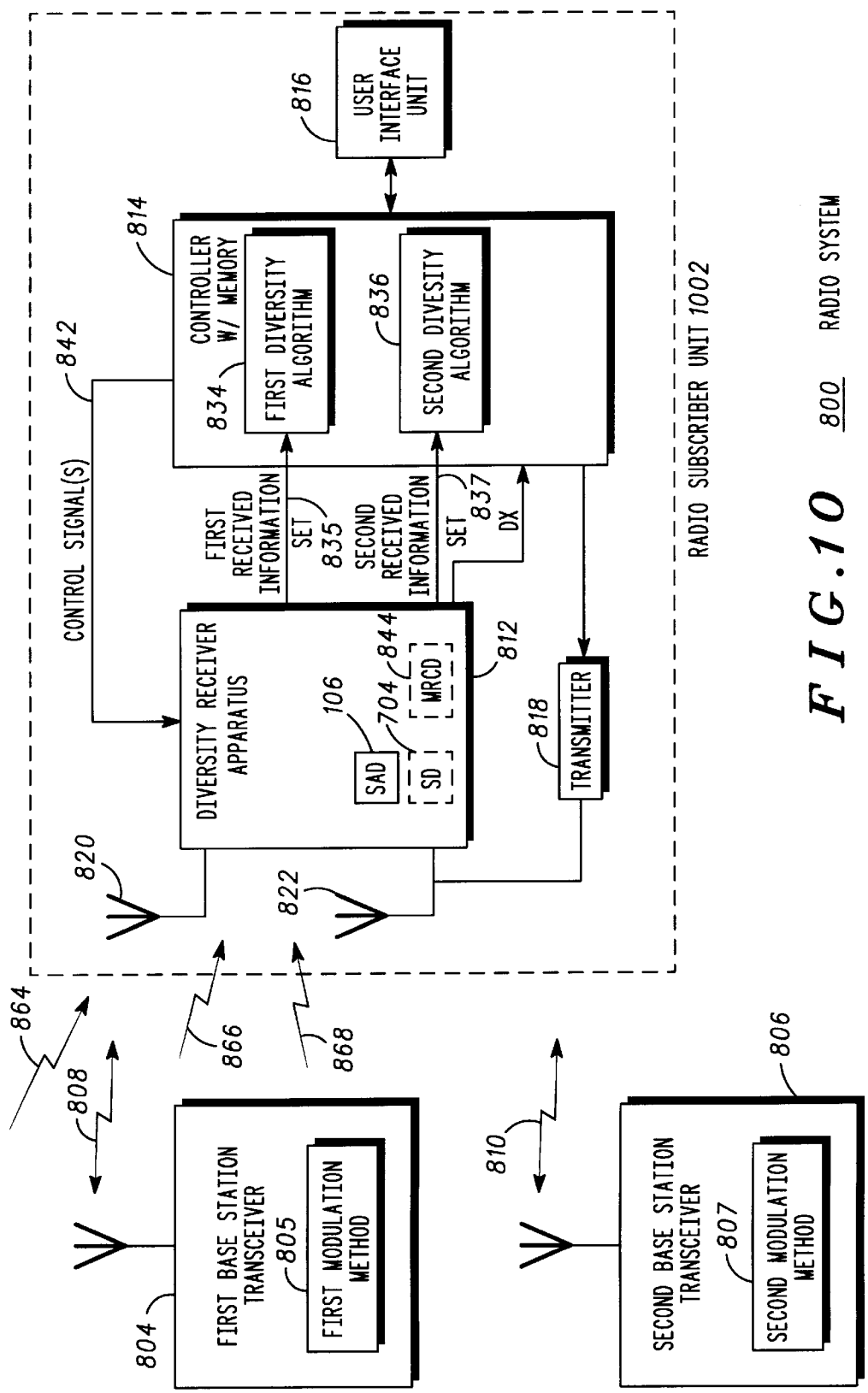
FIG. 10 illustrates a block diagram of a radio system including a fifth embodiment of a radio subscriber unit as an alternative embodiment to the third and fourth embodiments of the radio subscriber unit of FIGS. 8 and 9.

FIGS. 8, 9 and 10 each illustrate a block diagram of a radio system 800 including an embodiment of a radio subscriber unit. FIGS. 8, 9 and 10 are generally described with reference to Table 2, shown below.

TABLE 2

| Radio Unit | Received Information Sets | Algorithms |
| --- | --- | --- |
| Prior art | 1 | 1 |
| FIG. 8 | 1 | 2 |
| FIG. 9 | 2 | 1 |
| FIG. 10 | 2 | 2 |

The radio subscriber unit of the prior art, as shown in Table 1, uses only one diversity algorithm operating responsive to only one received information set. Typically, the only one received information set is an estimate of the received signal strength indication (RSSI). Typically, the only one diversity algorithm is used to control a diversity receiver apparatus embodied within a radio subscriber unit adapted to receive a RF signal modulated by an analog modulation method.

The radio subscriber unit of FIG. 8, as shown in Table 1, uses two or more diversity algorithms responsive to only one received information set. The radio subscriber unit of FIG. 9, as shown in Table 1, uses only one diversity algorithm responsive to two or more received information sets. The radio subscriber unit of FIG. 10, as shown in Table 1, uses two or more diversity algorithms responsive to two or more received information sets, respectively.

FIG. 8 illustrates a block diagram of a radio system 800 including a third embodiment of a radio subscriber unit 802. The radio system 800 generally includes the radio subscriber unit 802, a first base station transceiver 804, and a second base station transceiver 806.

The first base station transceiver 804 transmits and receives RF signals 808 using a first modulation method 805. The second base station transceiver 806 transmits and receives RF signals 810 using a second modulation method 807.

The radio subscriber unit 802 generally includes a diversity receiver apparatus 812, a controller 814, a user interface unit 816, and a transmitter unit 818. The diversity receiver apparatus 812 generally includes a first antenna 820, a second antenna 822. The controller 814 generally includes a first diversity algorithm 834, and a second diversity algorithm 836.

The operation of the radio subscriber unit 802 is now described. The diversity receiver apparatus 812 receives one of a first composite radio frequency (RF) signal 866 and a second composite RF signal 868. The first composite RF signal 866 includes a desired RF signal 808 modulated by a first modulation method 805 and interfering signals 864. The second composite RF signal 868 includes a desired RF signal 810 modulated by a second modulation method 806 and interfering signals 864. The controller 814 controls the diversity receiver apparatus 812 responsive to a first diversity algorithm 834 when the diversity receiver apparatus 812 receives the first RF signal 808 modulated by the first modulation method 805, and a second diversity algorithm 836 when the diversity receiver apparatus 812 receives the second RF signal 810 modulated by the second modulation method 807. The controller 814 controls the diversity receiver apparatus 812 via one or more control signal lines 842.

In the preferred embodiment, the diversity receiver apparatus 812 produces a first received information set 835 responsive to receiving the first RF signal 808 modulated by the first modulation method 805, and a second received information set 837, different from the first received information set 835, responsive to receiving the second RF signal 810 modulated by the second modulation method 807. The first diversity algorithm 834 operates responsive to the first received information set 835 and the second diversity algorithm 836 operates responsive to the second received information set 837.

In the preferred embodiment the first received information set 835 is exclusive of the second received information set 837. By example, the first received information set 835 includes ∫RSSI and the ratio of Ec/Io, and the second received information set 837 includes a RSSI. Alternatively, the second received information set 837 may be a subset of the first received information set 835.

Alternatively, the diversity receiver apparatus 812 produces a received information set 835 responsive to receiving one of the first RF signal 808 modulated by the first modulation method 805, and the second RF signal 810 modulated by the second modulation method 807. Both the first diversity algorithm 834 and the second diversity algorithm 836 operate responsive to the received information set 835 via line 838. Under these conditions second received information set 837 is not used. By example, the first diversity algorithm 834 and the second diversity algorithm 836 may operate responsive to a RSSI. This example may be implemented in a dual mode radio subscriber unit capable of operating in both an AMPS radio system and a GSM radio system. Therefore, the diversity algorithm is changed responsive to radio system type while using the RSSI to optimize the control of the diversity receiver apparatus operating in different radio systems.

The controller 814 determines whether the radio subscriber unit 802 is configured to receive the first RF signal 808 modulated by the first modulation method 805, or the second RF signal 810 modulated by the second modulation method 807 based on a predetermined system selection algorithm or by responding to an input from the user of the radio subscriber unit 802.

In the preferred embodiment, the diversity receiver apparatus 812 is a switched antenna diversity receiver apparatus 106, as shown in solid lines. A switched antenna diversity receiver 106 apparatus is generally described in the background of the invention of the present disclosure and is shown in FIG. 1, for example. Alternatively, the diversity receiver apparatus 812 may be a selection diversity receiver apparatus 704. A selection diversity receiver apparatus 704 is generally described in the background of the invention of the present disclosure and is shown in FIG. 7, for example. Further, the diversity receiver apparatus 812 may also be a maximal ratio combining diversity receiver apparatus 844. A maximal ratio combining diversity receiver apparatus 844 is generally described in the background of the invention of the present disclosure and is well to those skilled in the art.

The first modulation method 805 and the second modulation method 806 may each be either a digital modulation method or an analog modulation method. Further, the first modulation 805 and the second modulation 806 may each be different digital modulation methods or different analog modulation methods. Thus, by example, the radio subscriber unit 802 can adapt the diversity receiver apparatus 812 responsive to different modulation methods.

For example, the first modulation method 805 may be a digital modulation method or may be an analog modulation method. Again, by example, the first modulation method 805 may be a first digital modulation method and a second modulation method 807 may be a second digital modulation method, different from the first digital modulation method. Again, by example, the first digital modulation method 805 may be a first analog modulation method and the second modulation method 807 may be a second analog modulation method, different from the first analog modulation method.

The digital modulation methods may include, for example, Code Division Multiple Access (CDMA) modulation methods, Time Division Multiple Access (TDMA) modulation methods, Extended-Time Division Multiple Access (E-TDMA) modulation methods, and Global System for Mobile Communications (GSM) modulation methods. The analog modulation method may include, for example, Advanced Mobile Phone System (AMPS) modulation methods, Narrowband Advanced Mobile Phone System (NAMPS), Total Access Communications System (TACS) modulation methods, and Extended Total Access Communications System (E-TACS) modulation methods.

In the preferred embodiment, the first modulation method 805 is a digital modulation method, and, in particular, a CDMA modulation method. In the preferred embodiment, the second modulation method 807 is an analog modulation method, and, in particular, an AMPS modulation method.

A radio subscriber unit 802 that can communicate signals using a first modulation method or a second modulation method is known in the art as a dual mode radio subscriber unit. This means, for example, that the same radio subscriber unit 802 may operate with different radio systems, each radio system modulating their transmitted RF signal using a different modulation method. In the preferred embodiment, one radio system is a digital system and another system is an analog system.

The prior art does not address adapting the diversity receiver apparatus of a radio subscriber unit according to the radio system the radio subscriber unit is operating in. Therefore, the radio subscriber unit 802 advantageously optimizes the operation of the diversity receiver apparatus 812 according to radio system the radio subscriber unit 802 is operating in. Without this advantage, a prior art diversity receiver apparatus in a radio subscriber unit may be optimized using only one diversity algorithm when the first RF signal is modulated by the first modulation method in a first radio system. When the second RF signal is modulated by the second RF signal, the same one diversity algorithm may have only a minimal improvement on the reception of the second RF signal or may even potentially harm the reception of the second RF signal. Under these circumstances, the same one diversity algorithm may simply not be compatible between modulation methods. Alternatively, a prior art radio subscriber unit may compromise the performance of the one diversity algorithm when one of the first and the second RF signals are received in order to work adequately with both the first and the second modulation methods, respectively. The present invention does not harm the RF signal received and does not need to make these compromises.

The first diversity algorithm 834 and the second diversity algorithm 836 may each be well known in the art. In the preferred embodiment, the first diversity algorithm 834 is a unique CDMA diversity algorithm and is described in the present application with reference to FIGS. 1–7. FIGS. 1–7 describe a diversity algorithm for controlling a diversity receiver apparatus receiving a RF signal modulated by a CDMA modulation method. In the preferred embodiment, the second diversity algorithm 836 is a conventional diversity algorithm used for an AMPS modulation method.

In summary of the preferred embodiment as represented in FIG. 8, the radio subscriber unit 802 is a radiotelephone subscriber unit. The radiotelephone subscriber unit comprises the switched antenna diversity receiver apparatus 106 and the controller 814. The switched antenna diversity receiver apparatus 106 receives the first radio frequency (RF) signal 808 modulated by the digital modulation method 805, or the second RF signal 810 modulated by an analog modulation method 807. The controller 814 controls the switched antenna diversity receiver apparatus 106 responsive to the first diversity algorithm 834 when the switched antenna diversity receiver apparatus 106 receives the first RF signal 808 modulated by the digital modulation method 805, and the second diversity algorithm 836 when the switched antenna diversity receiver apparatus 106 receives the second RF signal 810 modulated by the analog modulation method 807.

Thus, the radio subscriber unit 802 not only adapts its operation to the dual-mode characteristics of the radio system 800, but also adapts its operation to control the diversity receiver apparatus 812 according to the selected mode in the radio system 800. Therefore, the diversity receiver apparatus 812 also has dual-mode capability to offer improved receiver performance in dual radio systems.

FIG. 9 illustrates a block diagram of a radio system including a fourth embodiment of a radio subscriber unit 902 as an alternative embodiment to the third embodiment of the radio subscriber unit 802 of FIG. 8. All common elements between FIG. 8 and FIG. 9 are labeled with the same reference numbers and no further description will be given for those same reference numbers.

The diversity receiver apparatus 812 produces a first received information set 835 responsive to receiving the first RF signal 808 modulated by the first modulation method 805, and the second received information set 837, different from the first received information set 835, responsive to receiving the second RF signal 810 modulated by the second modulation method 807. The controller 814 controls the diversity receiver apparatus 812 responsive to one of the first received information set 835 and the second received information set 837.

In the preferred embodiment, the controller 814 controls the diversity receiver apparatus 812 responsive to the first diversity algorithm 834 operating responsive to the first received information set 835, and the second diversity algorithm 836, shown in hatched lines, operating responsive to the second received information set 837. In this case, the second diversity algorithm 836 operates responsive to the second received information set 837 via dotted line 904. The first diversity algorithm 834 does not operate responsive to the second received information set 837, but only the first received information set 835. An example of this case is described with reference to FIG. 8.

Alternatively, the controller 814 may control the diversity receiver apparatus 812 responsive to the diversity algorithm 834 operating responsive to one of the first received information set 835, and the second received information set 837. By example, the first received information set 835 includes a ratio of Ec/Io and the second received information set 837 includes RSSI. By the same example, the diversity algorithm 834 controls the diversity receiver apparatus responsive to the quality of the information in the received information set. For example, the quality of the information may be defined as the magnitude of the ratio of Ec/Io or the RSSI. Typically, a higher magnitude of the ratio of Ec/Io or a higher value of RSSI is indicative of higher quality.

As with the third embodiment of the radio subscriber unit shown in FIG. 8, the first modulation method 805 and the second modulation method 807 may each be either a digital modulation method or an analog modulation method. Further, the first modulation method 805 and the second modulation method 807 may each be different digital modulation methods or different analog modulation methods.

Also, as with the third embodiment of the radio subscriber unit shown in FIG. 8, the diversity receiver apparatus is preferably a switched antenna diversity receiver apparatus 106. However, the diversity receiver apparatus may also be a selection diversity receiver apparatus 704 or a maximal ratio combining diversity receiver apparatus 844.

In summary of a preferred embodiment of the fourth embodiment of the radio subscriber unit 902 of FIG. 9, the radio subscriber unit 902 is a radiotelephone subscriber unit. The radiotelephone subscriber unit comprises the switched antenna diversity receiver apparatus 106 and the controller 814. The switched antenna diversity receiver apparatus 106 produces the first received information set 835 responsive to receiving the first RF signal 808 modulated by the digital modulation method 805, and the second received information set 837, different from the first received information set 835, responsive to receiving the second RF signal 810 modulated by the analog modulation method 807. The controller 814 controls the switched antenna diversity receiver apparatus 106 responsive to one of the first received information set 835 and the second received information set 837.

FIG. 10 illustrates a block diagram of a radio system including a fifth embodiment of a radio subscriber unit 1002 as an alternative embodiment to the third 802 and fourth 902 embodiments of the radio subscriber unit of FIGS. 8 and 9. All common elements between FIGS. 8, 9 and 10 are labeled with the same reference numbers and no further description will be given for those same reference numbers.

The radio subscriber unit 1002 comprises a diversity receiver apparatus 812 and a controller 814. The diversity receiver apparatus 812 produces a first received information set 835 responsive to receiving a first RF signal 808 modulated by a first modulation method 805, and a second received information set 837, different from the first received information set 835, responsive to receiving a second RF signal 810 modulated by a second modulation method 807. The controller 814 controls the diversity receiver apparatus 812 responsive to a first diversity algorithm 834 operating responsive to the first received information set 835, and a second diversity algorithm 836 operating responsive to the second received information set 837.

As with the third embodiment of the radio subscriber unit 802, shown in FIG. 8 and the fourth embodiment of the radio subscriber unit 902, shown in FIG. 9, the first modulation method 805 and the second modulation method 807 may each be either a digital modulation method or an analog modulation method. Further, the first modulation method 805 and the second modulation method 807 may each be different digital modulation methods or different analog modulation methods.

Also, as with the third embodiment of the radio subscriber unit 802, shown in FIG. 8 and the fourth embodiment of the radio subscriber unit 902, shown in FIG. 9, the diversity receiver apparatus 812 is preferably a switched antenna diversity receiver apparatus 106. However, the diversity receiver apparatus 812 may also be a selection diversity receiver apparatus 704 or a maximal ratio combining diversity receiver apparatus 844.

In summary of a preferred embodiment of the fifth embodiment of the radio subscriber unit 1002 of FIG. 10, the radio subscriber unit 1002 is a radiotelephone subscriber unit. The radiotelephone subscriber unit 1002 comprises the switched antenna diversity receiver apparatus 106 and the controller 814. The switched antenna diversity receiver apparatus 106 produces the first received information set 835 responsive to receiving the first RF signal 808 modulated by the digital modulation method 805, and the second received information set 837, different from the first received information set 835, responsive to receiving the second RF signal 810 modulated by an analog modulation method 807. The controller 814 controls the switched antenna diversity receiver apparatus 106 responsive to the first diversity algorithm 834 operating responsive to the first received information set 835, and the second diversity algorithm 836 operating responsive to the second received information set 837.

Figure 11:
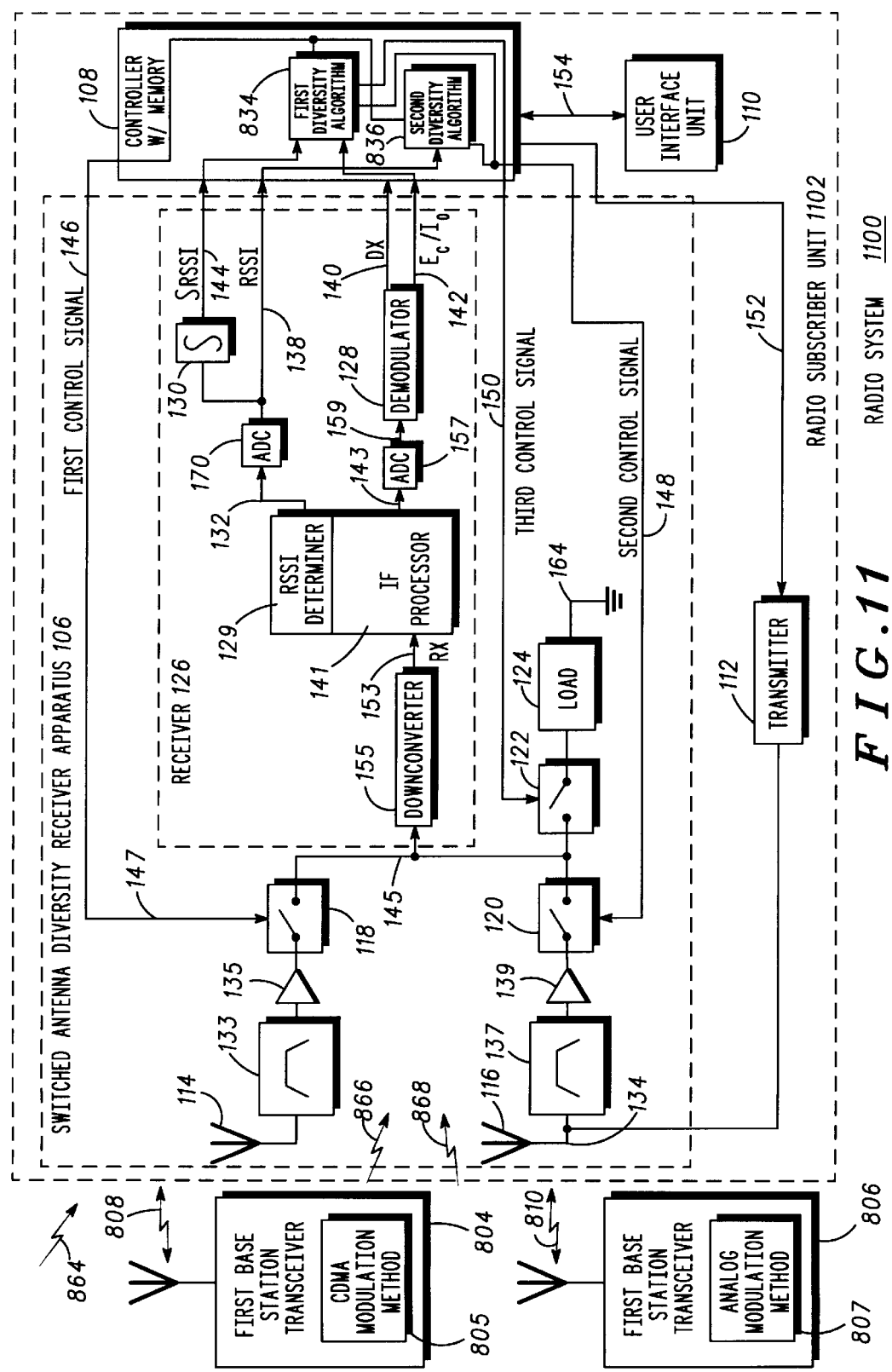
FIG. 11 illustrates a block diagram of a radio system including a radio subscriber unit incorporating the first embodiment of the radio subscriber unit of FIG. 1 and the third embodiment of the radio subscriber unit of FIG. 8.

FIG. 11 illustrates a block diagram of a radio system 1100 including a sixth embodiment of a radio subscriber unit 1102 incorporating the first embodiment of the radio subscriber unit 102 of FIG. 1 and the third embodiment of the radio subscriber unit 802 of FIG. 8. All common elements between FIGS. 1, 8 and 11 are labeled with the same reference numbers and no further description will be given for those same reference numbers.

In the sixth embodiment, the radio subscriber unit 1102 is a dual mode cellular radiotelephone subscriber unit. The dual mode cellular radiotelephone subscriber unit 1102 receives one of a first composite radio frequency (RF) signal 866 and a second composite RF signal 868. The first composite RF signal 866 includes a desired RF signal 808 and interfering signals 864. The desired RF signal 808 is a direct sequence spread spectrum (DSSS) signal. The DSSS signal includes at least one coded pilot signal (Ec). The second composite RF signal 868 includes a desired RF signal 810 and interfering signals 864.

The dual mode cellular radiotelephone subscriber unit 1102 comprises a switched antenna diversity receiver apparatus 106 and a controller 108. The switched antenna diversity receiver apparatus 106 produces a first received information set (∫RSSI 144 and Ec/Io 142) responsive to receiving the desired RF signal 808 modulated by a code division multiple access (CDMA) modulation method 805. The first received information set (∫RSSI 144 and Ec/Io 142) comprises a ratio (Ec/Io) of the at least one coded pilot signal (Ec) to the first composite RF signal (Io) and an integration of an estimate of a received signal strength indication of the first composite RF signal (∫RSSI). The switched antenna diversity receiver apparatus 106 also produces a second received information set (RSSI 138), different from the first received information set (∫RSSI 144 and Ec/Io 142), responsive to receiving the second RF signal 868 including the desired RF signal 810 modulated by an analog modulation method 807. The second received information set (RSSI 138) comprises an estimate of a received signal strength indication of the second RF signal (RSSI) 138. The controller 108 controls the switched antenna diversity receiver apparatus 106 responsive to a first diversity algorithm 834 operating responsive to the first received information set (∫RSSI 144 and Ec/Io 142), and a second diversity algorithm 836 operating responsive to the second received information set (RSSI 138).

The first diversity algorithm 834 controls the switched antenna diversity receiver apparatus 106 via the first 146, second 148 and third 150 control lines. The second diversity algorithm 834 controls the switched antenna diversity receiver apparatus 106 via the first 146 and the second 148 control lines.

What is claimed is:

1. A method for operating a radio subscriber unit having a diversity receiver apparatus including at least a first antenna and a second antenna, wherein the first antenna is at least partially uncorrelated with respect to the second antenna, the method comprising the steps of:

receiving a first representation and a second representation of a composite radio frequency (RF) signal from the first antenna and the second antenna, respectively, wherein the composite signal includes a desired direct sequence-code division multiple access (DS-CDMA) RF signal and interfering signals, and wherein the desired DS-CDMA RF signal includes at least one coded pilot signal;

determining at least one ratio of the at least one coded pilot signal to an estimate of the composite RF signal responsive to receiving at least one of the first representation of the composite RF signal and the second representation of the composite RF signal; and controlling a selected state of the first antenna and the second antenna responsive to the at least one ratio.

2. A method of operating a radio subscriber unit according to claim 1 wherein the diversity receiver apparatus is a switched antenna diversity receiver apparatus including the first antenna, the second antenna and a receiver, the method further comprising the step of:

generating, by the receiver, a received signal including the at least one coded pilot signal responsive to receiving at least one of the first representation of the composite DS-CDMA RF signal from the first antenna and the second representation of the composite DS-CDMA RF signal from the second antenna;

wherein the step of controlling further comprises the step of:

selectively coupling only the first antenna to the receiver, only the second antenna to the receiver or both the first antenna and the second antenna to the receiver responsive to the at least one ratio.

3. A method of operating a radio subscriber unit according to claim 1 wherein the diversity receiver apparatus is a selection diversity receiver apparatus including the first antenna, the second antenna, a first receiver and a second receiver, the method further comprising the steps of:

generating, by the first receiver, a first received signal including a first representation of the at least one coded pilot signal responsive to receiving the first representation of the composite DS-CDMA RF signal from the first antenna; and generating, by the second receiver, a second received signal including a second representation of the at least one coded pilot signal responsive to receiving the second representation of the composite DS-CDMA RF signal from the second antenna;

wherein the step of determining further comprises the steps of:

determining a first ratio of the first representation of the at least one coded pilot signal to an estimate of the composite DS-CDMA RF signal responsive to receiving the first representation of the composite DS-CDMA RF signal; and determining a second ratio of the second representation of the at least one coded pilot signal to an estimate of the composite DS-CDMA RF signal responsive to receiving the second representation of the composite DS-CDMA RF signal; and wherein the step of controlling further comprises the step of:

selecting either the first received signal or the second received signal responsive to at least one of the first ratio and the second ratio.

4. A method of operating a radio subscriber unit according to claim 1 wherein the step of controlling further comprises the steps of:

maintaining the selected state of the first antenna and the second antenna when the at least one ratio is favorable; and changing the selected state of the first antenna and the second antenna when the at least one ratio is unfavorable.

5. A method of operating a radio subscriber unit according to claim 4:

wherein the desired DS-CDMA RF signal includes at least one data signal, the at least one data signal includes a plurality of sequential symbols representing data, and each of the plurality of sequential symbols is divided into a plurality of time periods called chips; and wherein the step of changing occurs at an edge of a chip.

6. A method of operating a radio subscriber unit according to claim 5 wherein the edge of the chip corresponds to an edge of a symbol.

7. A method of operating a radio subscriber unit according to claim 1 wherein the desired DS-CDMA RF signal includes at least one data signal, wherein the at least one data signal includes a plurality of sequential symbols representing data, and wherein each of the plurality of sequential symbols is divided into a plurality of time periods called chips, wherein the step of controlling further comprises the step of:

changing the selected state of the selected state of the first antenna and the second antenna at an edge of a chip.

8. A method of operating a radio subscriber unit according to claim 1 wherein the edge of the chip corresponds to an edge of a symbol.

9. A method for operating a radio subscriber unit having a diversity receiver apparatus including at least a first antenna and a second antenna, wherein the first antenna is at least partially uncorrelated with respect to the second antenna, the method comprising the steps of:

receiving a first representation and a second representation of a composite radio frequency (RF) signal from the first antenna and the second antenna, respectively, wherein the composite signal includes a desired direct sequence-code division multiple access (DS-CDMA) RF signal and interfering signals, and wherein the desired DS-CDMA RF signal includes at least one coded pilot signal and at least one data signal, wherein the at least one data signal includes a plurality of sequential symbols representing data, and wherein each of the plurality of sequential symbols is divided into a plurality of time periods called chips;

measuring at least one received signal strength indication (RSSI) of the composite RF signal responsive to receiving at least one of the first representation of the composite RF signal and the second representation of the composite RF signal;

integrating the at least one RSSI of the composite RF signal over a plurality of the chips to produce at least one integrated RSSI of the composite RF signal; and controlling a selected state of the first antenna and the second antenna responsive to the at least one integrated RSSI of the composite RF signal.

10. A method of operating a radio subscriber unit according to claim 9 wherein the diversity receiver apparatus is a switched antenna diversity receiver apparatus including the first antenna, the second antenna and a receiver, the method further comprising the step of:

generating, by the receiver, a received signal including the at least one coded pilot signal responsive to receiving at least one of the first representation of the composite DS-CDMA RF signal from the first antenna and the second representation of the composite DS-CDMA RF signal from the second antenna;

wherein the step of controlling further comprises the step of:

selectively coupling only the first antenna to the receiver, only the second antenna to the receiver or both the first antenna and the second antenna to the receiver responsive to the at least one integrated RSSI of the composite DS-CDMA RF signal.

11. A method of operating a radio subscriber unit according to claim 9 wherein the diversity receiver apparatus is a selection diversity receiver apparatus including the first antenna, the second antenna, a first receiver and a second receiver, the method further comprising the steps of:

generating, by the first receiver, a first received signal including a first representation of the at least one coded pilot signal responsive to receiving the first representation of the composite DS-CDMA RF signal from the first antenna; and generating, by the second receiver, a second received signal including a second representation of the at least one coded pilot signal responsive to receiving the second representation of the composite DS-CDMA RF signal from the second antenna;

wherein the step of measuring further comprises the steps of:

measuring a first received signal strength indication (RSSI) of the composite DS-CDMA RF signal responsive to receiving the first representation of the composite DS-CDMA RF signal; and measuring a second received signal strength indication (RSSI) of the composite DS-CDMA RF signal responsive to receiving the second representation of the composite DS-CDMA RF signal;

wherein the step of integrating further comprises the steps of:

integrating the first RSSI of the composite DS-CDMA RF signal over a plurality of the chips to produce a first integrated RSSI of the composite DS-CDMA RF signal; and integrating the second RSSI of the composite DS-CDMA RF signal over a plurality of the chips to produce a second integrated RSSI of the composite DS-CDMA RF signal; and wherein the step of controlling further comprises the step of:

selecting either the first received signal or the second received signal responsive to at least one of the first integrated RSSI of the composite DS-CDMA RF signal and the second integrated RSSI of the composite DS-CDMA RF signal.

12. A method of operating a radio subscriber unit according to claim 9 wherein the step of controlling further comprises the steps of:

maintaining the selected state of the first antenna and the second antenna when the integrated RSSI is favorable; and changing the selected state of the first antenna and the second antenna when the integrated RSSI is unfavorable.

13. A method of operating a radio subscriber unit according to claim 12 wherein the step of changing occurs at an edge of a chip.

14. A method of operating a radio subscriber unit according to claim 12 wherein the edge of the chip corresponds to an edge of a symbol.

15. A method of operating a radio subscriber unit according to claim 9 wherein the step of controlling further comprises the step of:

changing the selected state of the first antenna and the second antenna at an edge of a chip.

16. A method of operating a radio subscriber unit according to claim 15 wherein the edge of the chip corresponds to an edge of a symbol.

17. A method of operating a radio subscriber unit according to claim 9 wherein the step of controlling further comprises the steps of:

configuring the selected state of the first antenna and the second antenna so that the diversity receiver apparatus receives the composite DS-CDMA RF signal from both the first antenna and the second antenna when the integrated RSSI is favorable; and configuring the selected state of the first antenna and the second antenna so that the diversity receiver apparatus receives the composite DS-CDMA RF signal from either only the first antenna or only the second antenna when the integrated RSSI is unfavorable.

18. A method of operating a radio subscriber unit according to claim 9 wherein the plurality of the chips integrated over to produce the integrated RSSI comprise a plurality of sequential chips.

19. A method of operating a radio subscriber unit according to claim 9 wherein the plurality of the chips integrated over to produce the integrated RSSI comprise a plurality of non-sequential chips separated by a predetermined number of sequential chips.

20. A method for operating a radio subscriber unit having a diversity receiver apparatus including at least a first antenna and a second antenna, wherein the first antenna is at least partially uncorrelated with respect to the second antenna, the method comprising the steps of:

receiving a first representation and a second representation of a composite radio frequency (RF) signal from the first antenna and the second antenna, respectively, wherein the composite signal includes a desired direct sequence-code division multiple access (DS-CDMA) RF signal and interfering signals, and wherein the desired DS-CDMA RF signal includes at least one coded pilot signal and at least one data signal, wherein the at least one data signal includes a plurality of sequential symbols representing data, and wherein each of the plurality of sequential symbols is divided into a plurality of time periods called chips;

determining whether or not the desired DS-CDMA RF signal substantially dominates the composite RF signal;

when it is determined that the desired DS-CDMA RF signal does not substantially dominate the composite RF signal perform the steps of:

determining at least one ratio of the at least one coded pilot signal to an estimate of the composite RF signal responsive to receiving at least one of the first representation of the composite RF signal and the second representation of the composite RF signal; and controlling a selected state of the first antenna and the second antenna responsive to the at least one ratio; and when it is determined that the desired DS-CDMA RF signal does substantially dominate the composite RF signal perform the steps of:

determining at least one ratio of the at least one coded pilot signal to an estimate of the composite RF signal responsive to receiving at least one of the first representation of the composite RF signal and the second representation of the composite RF signal;

measuring at least one received signal strength indication (RSSI) of the composite RF signal responsive to receiving at least one of the first representation of the composite RF signal and the second representation of the composite RF signal;

integrating the at least one RSSI of the composite RF signal over a plurality of the chips to produce at least one integrated RSSI of the composite RF signal; and controlling a selected state of the first antenna and the second antenna responsive to at least one of the at least one ratio and the at least one integrated RSSI of the composite RF signal.

* * * * *